(12) United States Patent
Peng et al.

(10) Patent No.: US 12,359,107 B2
(45) Date of Patent: *Jul. 15, 2025

(54) STABILIZED FLUOROOLEFIN REFRIGERANT COMPOSITIONS AND METHODS FOR THEIR PRODUCTION, STORAGE AND USAGE

(71) Applicant: THE CHEMOURS COMPANY FC, LLC, Wilmington, DE (US)

(72) Inventors: Sheng Peng, Hockessin, DE (US); Luke David Simoni, Wilmington, DE (US)

(73) Assignee: THE CHEMOURS COMPANY FC, LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/233,444

(22) Filed: Aug. 14, 2023

(65) Prior Publication Data

US 2023/0383159 A1 Nov. 30, 2023

Related U.S. Application Data

(63) Continuation of application No. 17/083,110, filed on Oct. 28, 2020, now Pat. No. 12,134,726, which is a continuation of application No. PCT/US2019/058435, filed on Oct. 29, 2019, and a continuation-in-part of application No. 17/047,860, filed as application No. PCT/US2019/029777 on Apr. 30, 2019, said application No. PCT/US2019/058435 is a continuation-in-part of application No. PCT/US2019/029777, filed on Apr. 30, 2019.

(60) Provisional application No. 62/664,751, filed on Apr. 30, 2018.

(51) Int. Cl.
| | | |
|---|---|---|
| *C09K 5/04* | (2006.01) | |
| *C10M 171/00* | (2006.01) | |
| *F25B 13/00* | (2006.01) | |
| *C10N 20/00* | (2006.01) | |
| *C10N 40/30* | (2006.01) | |

(52) U.S. Cl.
CPC ......... *C09K 5/045* (2013.01); *C10M 171/008* (2013.01); *F25B 13/00* (2013.01); *C09K 2205/102* (2013.01); *C09K 2205/122* (2013.01); *C09K 2205/126* (2013.01); *C09K 2205/22* (2013.01); *C10N 2020/101* (2020.05); *C10N 2040/30* (2013.01)

(58) Field of Classification Search
CPC . C09K 5/02; C09K 5/04; C09K 5/041; C09K 5/044; C09K 5/045; C09K 5/048; C09K 2205/102; C09K 2205/12; C09K 2205/122; C09K 2205/126; C09K 2205/22; C09K 2205/24; C07C 7/20; C07C 17/42; C10M 171/008; C10N 2020/101; C10N 2040/30; F25B 13/00
See application file for complete search history.

(56) References Cited

U.S. PATENT DOCUMENTS

| | | | |
|---|---|---|---|
| 1,098,865 | A | 6/1914 | Whitehall |
| 4,755,316 | A | 7/1988 | Magid et al. |
| 4,759,860 | A | 7/1988 | Tanaka et al. |
| 4,975,215 | A | 12/1990 | Abe et al. |
| 5,001,287 | A | 3/1991 | Fernandez et al. |
| 5,053,155 | A | 10/1991 | Mahler |
| 5,152,926 | A | 10/1992 | Brown |
| 5,355,695 | A | 10/1994 | Kawaguchi et al. |
| 5,454,963 | A | 10/1995 | Kaneko |
| 5,714,651 | A | 2/1998 | Elsheikh et al. |
| 5,976,399 | A | 11/1999 | Schnur |
| 6,258,292 | B1 | 7/2001 | Turner |
| 6,516,837 | B2 | 2/2003 | Thomas et al. |
| 6,969,701 | B2 | 11/2005 | Singh et al. |
| 7,622,435 | B2 | 11/2009 | Wilson et al. |
| 8,075,796 | B2 | 12/2011 | Rao et al. |
| 8,097,181 | B2 | 1/2012 | Leck et al. |
| 8,101,094 | B2 | 1/2012 | Howell et al. |
| 8,133,407 | B2 | 3/2012 | Zyhowski et al. |
| 8,133,921 | B2 | 3/2012 | Mcpartland |
| 8,147,709 | B2 | 4/2012 | Mahler et al. |
| 8,388,857 | B2 | 3/2013 | Elsheikh et al. |
| 8,535,555 | B2 | 9/2013 | Feiring et al. |
| 8,877,086 | B2 | 11/2014 | Mahler et al. |
| 9,347,446 | B2 | 5/2016 | Maeyama et al. |
| 10,465,141 | B2 | 11/2019 | Matsumoto |
| 2002/0046568 | A1 | 4/2002 | Thomas et al. |
| 2006/0022166 | A1 | 2/2006 | Wilson et al. |
| 2006/0043330 | A1 | 3/2006 | Wilson et al. |

(Continued)

FOREIGN PATENT DOCUMENTS

| | | |
|---|---|---|
| CA | 2557873 A1 | 11/2014 |
| DE | 102016212333 A1 | 1/2018 |

(Continued)

OTHER PUBLICATIONS

"3.1 Compatibility between Refrigerating machine oil and Refrigerant", column on pp. 454 to 455, 1993, A partial English translation of Trans. of the JAR, pp. 453 to 460, vol. 10, No. 3.

(Continued)

*Primary Examiner* — Matthew R Diaz

(57) ABSTRACT

The present invention relates to refrigerant compositions comprising at least one fluoroolefin, at least one lubricant and an effective amount of at least one inhibitor wherein the inhibitor is present in the fluoroolefin and the lubricant.

21 Claims, 5 Drawing Sheets

(56) References Cited

U.S. PATENT DOCUMENTS

| | | |
|---|---|---|
| 2006/0049081 A1 | 3/2006 | Tsubouchi et al. |
| 2006/0116310 A1 | 6/2006 | Singh et al. |
| 2007/0290164 A1 | 12/2007 | Kaneko |
| 2008/0157022 A1 | 7/2008 | Singh et al. |
| 2010/0016489 A1 | 1/2010 | Nagatoshi et al. |
| 2010/0025619 A1 | 2/2010 | Riva et al. |
| 2010/0181524 A1* | 7/2010 | Elsheikh ............... C09K 5/045 570/103 |
| 2010/0288965 A1* | 11/2010 | Howell ................. C09K 5/045 252/68 |
| 2010/0301259 A1 | 12/2010 | Leck et al. |
| 2011/0079040 A1 | 4/2011 | Morimoto et al. |
| 2011/0087055 A1 | 4/2011 | Tirtowidjojo et al. |
| 2011/0108757 A1 | 5/2011 | Shibanuma et al. |
| 2011/0190554 A1 | 8/2011 | Pigamo et al. |
| 2011/0272624 A1 | 11/2011 | Serrano et al. |
| 2011/0312101 A1 | 12/2011 | Tsuchiya et al. |
| 2012/0047925 A1* | 3/2012 | Rao ........................ C09K 5/045 252/68 |
| 2012/0059202 A1 | 3/2012 | Elsheikh et al. |
| 2012/0065437 A1 | 3/2012 | Merkel |
| 2012/0187330 A1 | 7/2012 | Singh et al. |
| 2013/0105724 A1* | 5/2013 | Boussand ............. C09K 5/045 252/68 |
| 2013/0123553 A1 | 5/2013 | Sekiguchi et al. |
| 2013/0161554 A1 | 6/2013 | Elsheikh et al. |
| 2013/0234062 A1 | 9/2013 | Tsuchiya et al. |
| 2014/0166922 A1 | 6/2014 | Elsheikh et al. |
| 2014/0314607 A1 | 10/2014 | Maeyama et al. |
| 2015/0051426 A1 | 2/2015 | Fukushima et al. |
| 2015/0080619 A1 | 3/2015 | Deur-Bert et al. |
| 2015/0322317 A1 | 11/2015 | Collier et al. |
| 2017/0096616 A1 | 4/2017 | Suetsugu |
| 2017/0137732 A1 | 5/2017 | Utaka |
| 2017/0146265 A1 | 5/2017 | Fujitaka et al. |
| 2017/0267906 A1 | 9/2017 | Minor et al. |
| 2017/0298287 A1 | 10/2017 | Tamura |
| 2017/0313858 A1 | 11/2017 | Tanaka et al. |
| 2017/0335230 A1 | 11/2017 | Matsumoto |
| 2018/0030325 A1 | 2/2018 | Petersen et al. |
| 2021/0040368 A1 | 2/2021 | Peng et al. |
| 2021/0108119 A1 | 4/2021 | Peng et al. |

FOREIGN PATENT DOCUMENTS

| | | |
|---|---|---|
| EP | 322701 A1 | 7/1989 |
| EP | 0582451 A1 | 2/1994 |
| EP | 2314654 A2 | 4/2011 |
| EP | 2402412 A1 | 1/2012 |
| EP | 1563032 | 5/2012 |
| EP | 2842928 A1 | 3/2015 |
| EP | 3107976 A4 | 12/2016 |
| EP | 2057245 B1 | 11/2019 |
| EP | 3822331 A1 | 5/2021 |
| EP | 2157457 B2 | 8/2022 |
| EP | 3775091 B1 | 4/2023 |
| JP | 04110388 A | 4/1992 |
| JP | 2011057885 A | 3/2011 |
| RU | 2073058 C1 | 2/1997 |
| WO | 0056834 A1 | 9/2000 |
| WO | 0075258 A1 | 12/2000 |
| WO | 2005042663 A1 | 5/2005 |
| WO | 2007126760 A2 | 11/2007 |
| WO | 2008027514 A1 | 3/2008 |
| WO | 2008027595 A1 | 3/2008 |
| WO | 2009018117 A1 | 2/2009 |
| WO | 2009042847 A1 | 4/2009 |
| WO | 2009158321 A1 | 12/2009 |
| WO | 2010002016 A1 | 1/2010 |
| WO | 2010075046 A2 | 7/2010 |
| WO | 2011077394 A1 | 6/2011 |
| WO | 2012074121 A1 | 6/2012 |
| WO | 2015126662 A1 | 8/2015 |
| WO | 2016181910 A1 | 11/2016 |
| WO | 2017178857 A1 | 10/2017 |
| WO | 2018022943 A1 | 2/2018 |
| WO | 2018022949 A2 | 2/2018 |
| WO | 2018165003 A1 | 9/2018 |
| WO | 2019213004 A1 | 11/2019 |

OTHER PUBLICATIONS

2002 Report of the Refrigeration, Air Conditioning and Heat Pumps Technical Options Committee, pp. 1-29.

Apollo Scientific Limited Safety Data Sheet, 1,1,3,3-Tetrafluoroprop-1-ene, Compilation date: Sep. 3, 2009, Revision date: Jul. 26, 2011.

ASHRAE Refrigeration Handbook, Chemical Reactions, 1998, pp. 5.6-5.7.

ASHRAE Refrigeration Handbook, Lubricants in Refrigerant Systems, 1998, pp. 7.3-7.4.

ASHRAE Transactions Part Two, Program, Abstracts and Summaries of Technical Sessions, Symposiums and Forums, Jun. 25-29, 1972, Annual Meeting—Nassau, Bahamas.

Clodic, Denis, Automobile Air Conditioning: Environmental Issues and Future Technical Alternatives, May 2008.

Decision of the Technical Board of Appeal 3.3.07 of Dec. 4, 2012, Kao Corporation, Decision of the Examining Division of the European Patent Office posted Dec. 30, 2010 refusing European patent application No. 05004107.8 pursuant to Article 97(2) EPC.

Decision revoking EP1716216B dated Apr. 13, 2012, Appendix A.

Declaration of Scott T. Jolley, PhD dated Sep. 23, 2014 in the Matter of an Opposition to European Patent EP-B-1563032, in the Name of Honeywell International Inc.

Declaration of Takashi Shibanuma dated Jul. 26, 2014.

European Patent No. 1 563 032 (EP Patent Application No. 03777896.6), Honeywell International Inc., Opposition by Mexichem Amanco Holding, S.A. de C.V., Sep. 21, 2012.

Exhibit No. Dai-11 dated Jan. 7, 2013, from Hoffman-Eitle. Fr.-Ing. habil. Ulrich Deh, Kfz-Klimaanlagen, 2., aktualisierte Auflage, Vogel Buchverlag.

Experimental Report.

Experimental Report of Miscibility Testing of HFO-1234YF and HFO-1234ZE with POE Lubricants.

Fluorine Chemistry: A Comprehensive Treatment, 1995, John Wiley & Sons, Inc., New York, NY.

Haruki Sato et al., Partial Translation of Exhibit A3 in Invalidation Trial against JPB4699758, Current Information on the Properties of Hydrofluorocarbons (HFCs) and Other Pure Refrigerants.

Hauptschein, Murray, et al., The Action of Elementary Fluorine upon Organic Compounds, The Vapor Phase Fluorination of CHCl=CCl—CHF2, Apr. 1951, pp. 1428-1430.

HFC Refrigerants, Compatibility with refrigeration oil, Daikin Industries, Ltd., Osaka, Japan.

HFO-1234yf Miscibility Separation Temperatures with PAG (ISO 46) Lubricant.

Honeywell Miscibility of Lubricants with Hydrofluoro-Olefins, Jun. 2010.

Honeywell PAG Lubricant Miscibility chart, Feb. 11-12, 2009, VDA Winter Meeting, Saalfelden, Austria.

Honeywell Safety Data Sheet, HFO-1234ze, HBA-1, Revision Date: Aug. 13, 2008, Print Date: Sep. 15, 2008.

Invalidation Trial against JPB4699758, Partial Translation of Exhibit A5.

Jolley, Scott T., Poylolester Lubricants for Use in Environmentally Friendly Refrigeration Applications, Symposium on Worldwide Perspectives on the Manufacture, Characterization and Application of Lubricant Base Oils Presented Before the Division of Petroleum Chemistry, Inc. ,Apr. 13-17, 1997, pp. 238-241, 213th National Meeting, American Chemical Society, San Francico, CA.

Limonene Safety Data Sheet, Jan. 17, 2017.

Miscibility of HFO-1234yf and Napthenic Mineral Oil (C3).

Miscibility of HFO-1234ze and Napthenic Mineral Oil (C3).

Modern Refrigeration and Air Conditioning, 2000, Chapter 9, pp. 343-344, 361-362, and 1133, The Goodheart-Willcox Company, Inc., Tinley Park, Illinois.

(56) References Cited

OTHER PUBLICATIONS

National Aeronautics and Space Administration (NASA) Contract No. NAS 7-918, Technical Support Package on Nearly Azeotropic Mixtures to Replace Refrigerant 12, Aug. 1992, NASA Tech Brief, vol. 16, No. 8, Item #122 from JPL New Technologye Report.
Nippon Carbide Kogyo Kabushiki Kaisha, Communication pursuant to Article 101(1) and Rule 81(2) to (3) EPC, dated Aug. 30, 2013 for EP Application No. 09014247.2.
Nippon Carbide Kogyo Kabushiki Kaisha, Interlocutory decision in Opposition proceedings (Art. 101(3)(a) and 106(2) EPZC), dated Feb. 5, 2014 for EP Application No. 09014247.2.
Nu-Calgon Refrigeration Oil Cross-Reference, www.nucalgon.com, St. Louis, MO.
Oral Hearing Summons dated Apr. 26, 2013, Applicant/Proprietor: Nippon Carbide Kogyo Kabushiki Kaisha, Application No. 0914247.2.
Ozone Layer on Track to Recovery: Success Story Should Encourage Action on Climate, Sep. 10, 2014.
Partial English Translation of Automotive Air Conditioning, 2nd ed., Series in Automotive Engineering, edited by Study Group on Automotive Air Conditioning under supervision of Satoshi Watanabe, published on Jan. 15, 2003, from Invalidation Trial No. 2011-800092 filed by Daikin Industries, Ltd., Japanese patent No. 4699758. Partial Translation of Exhibit Dai-8.
PCR Incorporated, Fluorocarbon Numbering, Chemicals for Research Scientists General Catalog, 1992.
Potter Clarkson Appendix F, EP1716216B (Application No. 05744161) Opposition by Inter Alia Mexichem Amanco Holding SA de CV, Feb. 27, 2012, Response to Oral Proceedings.
Refrigerants/Lubricants Approved for Use in Copeland® Compressors, 1993, Emerson(TM) Climate Technologies.
Review of Arkema and Arkema France Patents which relate to HFO-1234.
Review of Mexichem and Ineos Patents which relate to Fluoropropenes.
Safety Data Sheet, Solstice(TM) yf Refrigerant (R-1234yf), Honeywell International, Inc., Jun. 13, 2013.
Sato, Haruki et al., Current Information on the Properties of Hydrofluorocarbons (HFCs) and Other Pure Refrigerants, Partial Translation of Exhibit Dai-9.
Sjoholm, L.J., et al., Twin-Screw Compressor Performance and Suitable Lubricants with HFC-134a, 1990 International Compressor Engineering Conference at Purdue University, West Lafayette, Indiana.
Symposium on Worldwide Perspectives on the Manufacture, Characterization and Application of Lubricant Base Oils Presented Before the Division of Petroleum Chemistry, Inc., American Chemical Society, Apr. 13-17, 1997, 213th National Meeting, San Francisco, CA.
The Rates of Chemical Reactions, Apr. 17, 2000, Chapter Two.
Tojo, Kenji et al., Insulation Systems and Materials for Hermetic Motor, Latest New Refrigerant and Insulation System Technology, Apr. 15, 1996, Osaka, Japan.
Transactions of the Japan Society of Refrigerating and Air Conditioning Engineers, 2001.
Update: 1234yf as a replacement for R134a, 2008, Mac Summit.
Notice of Opposition submitted by Mexichem Fluor S.A. de C.V. dated Sep. 4, 2023.
Notice of Withdraw of Opposition submitted by Mexichem Fluor S.A. de C.V. dated Oct. 2, 2023.
U.S. Appl. No. 62/664,761, filed Apr. 30, 2018.
Acknowledgement of Receipt and Response filed by Kilburn & Strode LLP, for European Patent No. 1716216 (05744161.0) In the name of Honeywell International Inc., Appeal File No. T0860/12, Jul. 10, 2014.
ARI Standard 700, 2006 Standard for Specifications for Fluorocarbons Refrigerants, Air-Conditioning and Refrigeration Institute, 2006.
Arkema Beefs Up Chemicals; Eyes Acquisition of Acrylics Assets, business & finance news, Chemical Week Article.
ASHRAE 97, Sealed Glass Tube Method to Test the Chemical Stability of Materials for Use within Refrigerant Systems, 2007, Atlanta, GA.
ASHRAE Handbook, Refrigeration Systems and Applications, Lubricants in Refrigerant Systems, 1990, Chapter 8.
Automakers Develop CO2-Based Air Conditioning, Mar. 12, 2013 Press Release, Energy Manager News, Environmental Management White Paper Library.
Bivens et al., Fluoroethers and Other Next-Generation Fluids, ASHRAE/NIST Refrigerants Conference, Oct. 1997, pp. 122-134.
Calm, James et al., Trade-Offs in Refrigerant Selections: Past, Present and Future, Oct. 1997, ASHRAE/NIST Refrigerant Conference.
Chambers, Richard et al., Free Radical Chemistry. Part 9. Approaches to Fluorinated Polyethers—Model Compound Studies, Israel Journal of Chemistry, 1999, pp. 133-140, vol. 39.
Chemicals for Research Scientists, General Catalog, 1992, PCR Incorporated.
Clodic, et al., Characteristics and Performances of New Refrigerants, 1999.
Curriculum Vitae for Peral-Antunez, Enrique.
Declaration of Stuart Corr, Sep. 26, 2014, In the matter of European Patent No. 1563032 in the name of Honeywell International, Inc. and in the matter of the opposition thereto by Mexichem Amanco Holding SA de CV.
Designation and Safety Classification of Refrigerants, ANSI/ASHRAE Standard 34-2001, pp. 1-13, Atlanta, Georgia.
DuPont Announces Increased Supply of Opteon YF, HFO-1234yf Refrigerant, Jan. 15, 2014 Press Release by aftermarketNews staff.
DuPont Fluorochemicals Increases Supply of More Sustainable Opteon(TM) YF Refrigerant and Makes its First Commercial Shipment from China, Oct. 17, 2012, Announcement on dupont.com.
Gicquel, Renaud, Thermodynamic Diagrams Mixtures used in Refrigeration, 2003.
Global Product Strategy (GPS) Safety Summary, Isoprene, Jun. 4, 2015, pp. 1-5.
Hardy, Bob, Program, Abstracts and Summaries of Technical Sessions, Symposiums and Forums, Jun. 26, 1972, Annual Meeting, Nassau, Bahamas.
Honeywell Alpha Methylstyrene Product Stewardship Summary, Dec. 2012.
Honeywell Announces Major Investments to Increase HFO-1234yf Production in The United States, Dec. 10, 2013 Press Release.
Honeywell Material Safety Data Sheet for Genetron® 245fa, Dec. 2005.
Honeywell Material Safety Data Sheet for HCFC-123, 2004.
Honeywell Partners With Japanese Manufacturer to Further Increase Supply for New, Environmentally Preferable Automobile Refrigerant, Jan. 23, 2014 Press Release.
Howe-Grant, Mary, Fluorine Chemistry: A Comprehensive Treatment, 1995, John Wiley & Sons, Inc., New York, NY.
Hudlicky, Milo, Organic Fluorine Chemistry, 1971, Plenum Press, New York, NY.
Jeanneaux et al., Thermal Addition of 1-Iodoperfluoroalcanes to Perfluoroalkylethylenes, Journal of Fluorine Chemistry, 1974, pp. 261-270.
Jones et al., Nearly Azeotropic Mixtures to replace refrigerant 12, Aug. 1992, NASA Tech Brief vol. 16, No. 8, Item #122 from JPL New Technology Report NPO-18030/7528.
Kopko, William L., Beyond CFCs: Extending the Search for New Refrigerants, 1989, pp. 39-46, York International Corporation, York Pennsylvania.
Kruse, H., CFC research programmes in Western Europe, Int. J. Refrig., Mar. 1990, pp. 122-130 vol. 13.
Kuijpers, LJM, Impact of the Decrease in CFC Emissions on Refrigeration: Target of the IIR Initiative, Int. J. Refrigeration, Nov. 1988, vol. 11, No. 6.
MAC update: Dalmier stands firm on CO2; dismisses assertions that 1234yf is safe, Dec. 19, 2013, Everything R744 R744.com Article.
Material Safety Data Sheet for Solstice(TM) 1234ze, Honeywell International, Inc., Apr. 25, 2012.

(56) References Cited

OTHER PUBLICATIONS

Mexichem Fluor Inc., TSCA Section 8(e) Document Control No. 8EHQ-10-17890, Subject Chemical: 3,3,-trifluoroprop-1-ene (CAS No. 677-21-4), Alternative Name: Refrigerant 1243zf (R-1243zf), Jan. 31, 2011.
Miscibility of HFO-1336 Article.
Note for the attention of the Members of the Technical Committee of Motor Vehicles (TCMV), Feb. 12, 2013, 1st page only, letter from European Commission Enterprise and Industry Directorate-General, Sustainable Growth and EU 2020 Sustainable Mobility and Automotive Industry, Brussel, Belgium.
PCT International Search Report and Written Opinion mailed Feb. 11, 2020.
PCT International Search Report and Written Opinion mailed Jul. 11, 2019.
Pentaerythritol Ester Synthesis and Miscibility Testing Article.
Refrigerant System Chemistry, 1998 ASHRAE® Handbook, Refrigeration, 1998, p. 5.1, SI Edition, Atlanta, Georgia.
Report: Daimler begins testing CO2 Mac prototypes, VW in development, Jan. 10, 2014, Article from Green Car Congress.
Saalfelden, Compressor Testing Results & Findings with the usage of HFO-1234yf, Feb. 12, 2009, Visteon.
Sanvordenker, Keshav S. et al., A Review of Sunthetic Oils for Refrigeration Use, ASHRAE Translation Part II, 1972, vol. 78.
Shubkin, Ronald L., Synthetic Lubricants and High-Performance Functional Fluids, 1993, Marcel Dekker, Inc., New York, N.
Smith, N. Dean, New Chemical Alternatives for CFCs and HCFCs, Mar. 24, 1992, United States Environmental Protection Agency Office of Research and Development, Air and Engineering Research Laboratory, Research Triangle Park, NC 27711.
System Practices for Halocarbon Refrigerants, 1998 ASHRAE® Handbook, Refrigeration, 1998, p. 2.25, SI Edition, Atlanta, Georgia.
Then it made zoom . . . ACService / Currently, manufactuers of air conditioning service units are confronted with a phenomenon in which spontaneous polymerization with the refrigerant R1234yf occurs. Auto Service Praxis, Aug. 7, 2020, pp. 34-35, www.autoservicepraxis.de.
Toxicity of Possible Impurities and By-Products in Fluorocarbon Products, Technical Report No. 103, 2008, European Centre for Exotoxicology and Toxicology of Chemicals, Brussels, Belgium.
Ulrich Deh, Dr.-Ing. Habil, Car Air Conditioners, 2003, pp. 74-75, Vogel Buchverlag, Germany.
Volkswagen follows Daimler in opting for CO2 refrigerant, EurActive.com Publication, Nov. 3, 2013.
Notice of Opposition submitted by Arkema France dated Jan. 5, 2024.
2,3,3,3-Tetrafluorpropen.
Acura Service Bulletin, Sep. 29, 1992.
Anlage WRST1.
Apollo Scientific Limited Safety Data Sheet, 1H,1H-Perfluoroprop-1-ene, Compilation date: Jul. 21, 2008, Revision date: Jul. 22, 2011.
ASHRAE Handbook, Refrigeration, Refrigerant System Chemistry, 1998, pp. 5.1, Atlanta, GA.
ASHRAE Handbook, Refrigeration, System Practices for Halocarbon Refrigerants, 1998, pp. 2.25, Atlanta GA.
ASHRAE Refrigeration Handbook, 2006, pp. 5.5-5.6.
ASHRAE Standard 34-2001, Designation and Safety Classification of Refrigerants, 2001, pp. 1-13.
Compressor Testing Results & Findings with the usage of HFO-1234yf, Feb. 12, 2009, Saalfelden.
Downing, Ralph C., Oil Relationships, Fluorocarbon Refrigerants Handbook, 1998, pp. 207-208, Chapter 9, Prentice Hall, Englewood Cliffs, New Jersey.
Emulsion Polymerization to Fibers, Manufacture, Encyclopedia of Polymer Science and Engineering, 1986, pp. 225, pp. 235-236, pp. 267-268, vol. 6, John Wiley & Sons.
Environmental Chemistry of Chlorofluorocarbon and Control Engineering (Quarterly Issue of General Review of Chemistry No. 11), 1991, Edited by the Chemical Society of Japan, Published by Gakkai Syuppan Center.
Honeywell International Inc. submission in opposition proceedings to EP Application No. EP03777896.6 (EP1563032), Dec. 17, 2013.
Honeywell Material Safety Data Sheet, Solstice(TM) 1234ze, Revision date: Apr. 25, 2012, Print Date: Dec. 20, 2013.
Hughes, H. Michael, Refrigerants, Refrigeration Systems for HVAC, 1997, Chapter 6.1, Buffalo, New York.
Komatsuzaki et al., Lubricants for HFC Refrigerant Compressors, 1994, pp. 226-235, vol. 37, No. 3, Sekiyo Gakkaishi.
Opposition filing for EP1563032B1 dated Jan. 28, 2013.
Peral-Antunez, Enrique Curriculum Vitae.
Public Review Draft, ANSI/ASHRAE Standard 34-2007, Proposed Addendum z to Standard 34-2007, Designation and Safety Classification of Refrigerants, Sep. 12, 2008, Atlanta, GA.
Puhl, Christian, Refrigeration Oils for Future Mobile A/C Systems, 2009, VDA Winter Meeting Saalfelden, Fuchs Europe Schmierstoffe.
Uemura, et al., Evaluation for Practical Application of HFC Refrigerants, Transactions of the Japanese Association of Refrigeration, 1993, vol. 10, pp. 453-460.
Safety Data Sheet according to Regulation (EC) No. 1907/2006, Annex II, Waeco AirCon Service, 2022.
Safety Data Sheet, Denso, ND-Oil 8, according to Regulation (EC) No. 1907/2006 (REACH) with its amendment Regulation (EU) 2020/878, Issue Date: Oct. 23, 2018, Revision Date: Feb. 26, 2021, Supersedes Date: Sep. 23, 2019, Version 3.0.
What you need to know about DENSO compressor oils, Product Bulletin, Jan. 2021, Bulletin No. 01-AC-2021-EU.
2008 Appendix C for Analytical Procedures for AHRI Standard 700-2014—Normative, Appendix C to AHRI Standard 700-2014 (formerly Appendix C to AHRI Standard 700-2012), Air-Conditioning, Heating & Refrigeration Institute, Arlington, Virginia.
GL Sciences Homepage, Products, GC Packed cols. and Absorbents, Applications, Inorganic gases; https://www.glsciences.com/product/gc_packings/analysis_example/01432.html.
Richter, Markus et al., Thermodynamic Properties of 2,3,3,3-Tetrafluoroprop-1-ene (R1234yf): Vapor Pressure and p-p-T Measurements and an Equation of State, Journal of Chemical & Engineering Data, 2011, pp. 3254-3264.
Rohatgi Ngoc Dung (Rosine) et al., AHRTI Report No. 09004-01, Material Compatibility & Lubricants Research for Low GWP Refrigerants—Phase I: Thermal and Chemical Stability of Low GWP Refrigerants with Lubricants, AHRTI (Air-Conditioning, Heating and Refrigeration Technology Institute) Final Report, Mar. 2012, Spauschus Associates, Inc. Sylva, North Carolina.

* cited by examiner

STABILIZED FLUOROOLEFIN REFRIGERANT COMPOSITIONS AND METHODS FOR THEIR PRODUCTION, STORAGE AND USAGE

This Application is a Continuation of U.S. application Ser. No. 17/083,110 which is a Continuation of International Application No. PCT/US2019/058435 filed on Oct. 29, 2019, and also is a Continuation-in-Part of U.S. application Ser. No. 17/047,860 filed on Oct. 15, 2020, which is a 371 of International Application No. PCT/US2019/029777 filed Apr. 30, 2019, that claims the benefit of Application No 62/664751, filed Apr. 30, 2018. International Application No. PCT/US2019/058435 is a continuation-in-part of International Application No. PCT/2019/02977, filed on Apr. 30, 2019. The disclosures of PCT/2019/02977, PCT/US2019/058435, 17/047860, and 62/664751 are hereby incorporated by reference.

BACKGROUND OF THE INVENTION

1. Field of the Invention

The present invention relates broadly to stabilized refrigerant compositions comprising at least one fluoroolefin, at least one lubricant and at least one inhibitor comprising at least one member selected from the group consisting of limonene, α-terpinene, α-tocopherol, butylated hydroxytoluene, 4-methoxyphenol, benzene-1,4-diol wherein the inhibitor is present in a liquid fluoroolefin as well as the lubricant.

2. Description of Related Art

New environmental regulations on refrigerants have forced the refrigeration and air-conditioning industry to look for new refrigerants with low global warming potential (GWP).

Replacement refrigerants are being sought that have low GWP, no toxicity, non-flammability, reasonable cost and excellent refrigeration performance.

Fluoroolefins have been proposed as refrigerants, alone or in mixtures. These products have been extensively tested for chemical stability and compatibility with materials typically used in air conditioning or refrigeration systems (ref. "1234yf-A Low GWP Refrigerant For MAC, Honeywell/DuPont Joint Collaboration" presentation to JAMA/JARIA, Oct. 3, 2007) and shown to be stable under typical operating conditions. However, it has been observed that certain fluoroolefins can exhibit degradation and/or produce unwanted by-products under abnormal conditions such as extreme temperatures or contact with other compounds in a contaminated system (e.g., excessive oxygen, oxidizing chemicals, or radical generating compounds, among various contaminants) that might occur unexpectedly in a particular use and/or application. Such degradation may occur when fluoroolefins are utilized as refrigerants or heat transfer fluids. This degradation may occur by any number of different mechanisms. Examples of stabilized refrigerant compositions are disclosed in JP 2009298918; U.S. Pat. Nos. 6,969,701; 8,133,407; US 2006/0022166; US 2006/0043330; US 2008/0157022; and WO 2007/126760 as well as EP 2057245; U.S. Pat. Nos. 8,101,094; 8,535,555; 8,097,181, and 8,075,796; the disclosure of which is hereby incorporated by reference.

Under certain abnormal conditions and in the presence of undesired contaminants that could function as an initiator, fluoroolefins may oligomerize or homopolymerize in the presence of certain contaminants that may be present. Accordingly, there is a need in this art for stabilized fluoroolefin containing refrigerant compositions having reduced, if not eliminated potential to oligomerize or homopolymerize.

SUMMARY OF THE INVENTION

The instant invention can solve problems associated with polymerization initiation by providing at least one inhibitor that is present in a liquid fluoroolefin as well as a lubricant. In particular, the present invention can improve the ability of hydrofluoroolefin containing refrigerant composition to withstand abnormal conditions, and also solves potential problems associated with initiators (e.g., contaminants) causing a fluoroolefin (e.g., tetrafluoropropene) to oligomerize or homopolymerize, by adding at least one inhibitor to a fluoroolefin containing composition. By "inhibitor" it is meant to refer to at least one compound in accordance with the present invention that reduces, if not eliminates, conversion of hydrofluoroolefins into oligomers or polymers. While oligomerization or homopolymerization reactions may be accelerated by relatively high temperatures, such reactions may also occur under ambient conditions depending upon the concentration and type of initiator (e.g., contaminant). The inhibitor can function as a radical inhibitor and without affecting the refrigeration performance or compatibility of the refrigerant composition with refrigerant oil and parts. The stabilized refrigerant compositions may be useful in cooling systems and as replacements for existing refrigerants with higher global warming potential.

To avoid possible instability of the fluoroolefins, it has been found that adding certain inhibitor compounds, namely hydrocarbons comprising at least one of cyclic monoterpenes lipophilic organic compounds including tocopherols such as α-Tocopherol; phenols, aromatic organic compounds having at least one chemical moiety C6H4(OH) including benzene-1,4-diol, to fluoroolefin containing refrigerant compositions will increase the stability thereof during packaging, storage and usage in refrigeration or air-conditioning system applications. Specific examples of inhibitor compounds comprise at least one member selected from the group consisting of limonene, α-terpinene, α-Tocopherol, Butylated hydroxytoluene, 4-Methoxyphenol, Benzene-1,4-diol. In one embodiment of the invention, the inventive inhibitor composition comprises a liquid at a temperature from about −100 to about 220° C., about −90 to about 200° C. and in some cases about −80 to about 185° C.

In one particular embodiment, the invention relates to fluoroolefin containing refrigerant compositions comprising an inhibitor that can interact or react with $O_2$ and fluoroolefin polyperoxidesand in turn inhibit or preclude reaction of such compounds with a hydrofluorolefin. Examples of such an inhibitor comprise at least one of limonene and a-terpinene. Limonene and α-terpinene have the following structures:

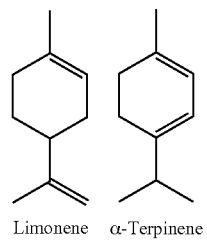

Limonene    α-Terpinene

In one embodiment of the invention, the inhibitor comprises α-terpinene. Without wishing to be bound by any theory or explanation, it is believed that due to the presence of the conjugated double bond in its structure, α-terpinene can form an aromatic ring upon oxidation.

In one embodiment of the invention, limonene or α-terpinene optionally with an antioxidant has unique fragrant even at a few ppm level. This pleasant odor can be utilized for refrigerant leakage detection with refrigerant and blends based on hydrofluoroolefins (e.g., comprising at least one of 1234yf, 1234ze and combinations thereof). This is especially beneficial for early refrigerant leakage detection in household air conditioner or mobile air conditioner as paraprofessional electronic leak detectors often are not available in either location.

One embodiment of the invention relates to a refrigerant composition comprising:
a. at least one fluoroolefin;
b. at least one lubricant; and
c. an effective amount of at least one inhibitor comprising: hydrocarbons comprising cyclic monoterpene; lipophilic organic compounds including tocopherol including α-Tocopherol; phenols, aromatic organic compounds having the chemical formula C6H4(OH) including benzene-1,4-diol, wherein the inhibitor is present in a liquid fluoroolefin as well as the lubricant.

One embodiment of the invention relates to any of the foregoing refrigerant compositions and further comprising at least one anti-oxidant. While any suitable oxidant can be employed, examples of suitable oxidants comprise at least one member selected from the group consisting of butylated hydroxytoluene, butylated hydroxyanisole, tertiary-butylhydroquinone, gallate, 2-phenyl-2-propanol, 1-(2,4,5-trihydroxyphenyl)-1-butaone, bisphenol methane derivatives, 2,2'-methylene bis (4-methyl-6-t-butyl phenol), among other phenolics, and combinations thereof.

One particular embodiment relates to using the foregoing anti-oxidants with an inhibitor comprising at least one of limonene and α-terpinene.

Another embodiment of the invention relates to a method for stabilizing a refrigerant composition comprising at least one fluoroolefin, said method comprising adding an effective amount of at least one inhibitor wherein the inhibitor is a hydrocarbon comprising at least one member selected from the group consisting of cyclic monoterpene; lipophilic organic compounds including tocopherol including α-Tocopherol; phenols, and aromatic organic compounds having the chemical formula C6H4(OH) including benzene-1,4-diol, and mixtures thereof, to said composition comprising at least one fluoroolefin.

Another embodiment of the invention relates to a method for reducing oligomerization or homopolymerization of a refrigerant composition comprising at least one fluoroolefin, which is caused by the presence of an inadvertent or undesired contaminant present in at least one of conduits, lines and other systems used for handling the fluoroolefin containing refrigerant compositions; packaging (containers), and a refrigeration, air-conditioning or heat pump system, said method comprising adding an inhibitor comprising at least one hydrocarbons comprising cyclic monoterpenes lipophilic organic compounds including tocopherol including α-Tocopherol; phenols, aromatic organic compounds having the chemical formula C6H4(OH) including benzene-1,4-diol, and mixtures thereof, to at least one of said system, container and composition comprising at least one fluoroolefin.

A further embodiment of the invention relates to a fluoroolefin containing refrigerant composition within a container wherein the fluoroolefin has a reduced potential to oligomerize or homopolymerize in comparison to refrigerant compositions without the inventive inhibitor composition.

One embodiment of the invention relates to a refrigerant composition comprising at least one fluoroolefin and an effective amount of at least one inhibitor and wherein the composition is substantially free of oligomeric, homopolymers or other polymeric products derived from the fluoroolefin.

Another embodiment of the invention relates to any of the foregoing refrigerant compositions wherein the composition comprises less than about 0.03 wt.% of oligomeric, homopolymers or other polymeric products.

Another embodiment of the invention relates to any of the foregoing refrigerant compositions and further comprising at least one member selected from the group consisting of air, oxygen, cumene hydroperoxide, and fluoroolefin polyperoxides, peroxides, hydroperoxides, persulfates, percarbonates, perborates and hydropersulfatees.

Another embodiment of the invention relates to any of the foregoing refrigerant compositions wherein the inhibitor comprises at least one member selected from the group consisting of limonene, α-terpinene, α-tocopherol, butylated hydroxytoluene, 4-methoxyphenol, benzene-1,4-diol.

Another embodiment of the invention relates to any of the foregoing refrigerant compositions wherein the fluorolefin comprises at least one member of HFO-1234yf and HFO-1234ze.

Another embodiment of the invention relates to any of the foregoing refrigerant compositions and further comprising at least one member selected from the group consisting of HFC-32, HFC-125, HFC-134a, HFC-152a, HFC-227ea and carbon dioxide.

Another embodiment of the invention relates to any of the foregoing refrigerant compositions and further comprising at least one member selected from the group consisting of HFC-134a, HFO-1243zf, HFO1225ye, HFO-1234ze, 3,3,3-trifluoro-1-propyne, HCFO-1233xf, HFC-244bb and HFC-245cb.

Another embodiment of the invention relates to any of the foregoing refrigerant compositions and further comprising at least one member selected from the group consisting of HCC-40, HCFC-22, CFC-115, HCFC-124, HCFC-1122, and CFC-1113.

Another embodiment of the invention relates to any of the foregoing refrigerant compositions wherein the inhibitor is present in an amount of about 30 to about 3,000 ppm.

Another embodiment of the invention relates to any of the foregoing refrigerant compositions and further comprising at least one member selected from the group consisting of butylated hydroxytoluene, butylated hydroxyanisole, tertiary-butylhydroquinone, gallate, 2-phenyl-2-propanol, 1-(2,4,5-trihydroxyphenyl)-1-butaone, phenolics, bisphenol methane derivatives, and 2,2'-methylene bis (4-methyl-6-t-butyl phenol).

Another embodiment of the invention relates to any of the foregoing refrigerant compositions wherein the inhibitor comprises at least one of limonene and α-terpinene.

Another embodiment of the invention relates to any of the foregoing refrigerant compositions wherein the inhibitor comprises a liquid at a temperature of about −80 to 180° C.

Another embodiment of the invention relates to any of the foregoing refrigerant compositions and optionally further comprising at least one antioxidant.

Another embodiment of the invention relates to any of the foregoing refrigerant compositions and further comprising at least one member selected from the group consisting of HFO-1225yeZ, HFO-1243zf, HFO-1234ze, HFC-236ea, HFC-245fa, and 3,3,3-trifluoropropyne.

Another embodiment of the invention relates to any of the foregoing refrigerant compositions wherein the member comprises HFO-1234ze, HFO-1225yeZ and 3,3,3-trifluoropropyne.

Another embodiment of the invention relates to any of the foregoing refrigerant compositions wherein the composition is substantially free of at least one of ammonia and CF3I.

Another embodiment of the invention relates to any of the foregoing refrigerant compositions wherein the composition consists essentially of HFO-1234yf and limonene and does not contain ammonia or CF3I.

Another embodiment of the invention relates to any of the foregoing refrigerant compositions wherein the composition consists essentially of HFO-1234yf, 3,3,3-trifluoropropyne and limonene.

One embodiment of the invention relates to a method for reducing formation of oligomers and homopolymers comprising contacting a refrigerant composition comprising at least one fluroolefin with an amount of at least one member selected from the group consisting of limonene, α-terpinene, α-tocopherol, butylated hydroxytoluene, 4-methoxyphenol, and benzene-1,4-diol, that is effective to reduce oligomer or homopolymer formation.

Another embodiment of the invention relates to any of the foregoing methods wherein the refrigerant composition has been exposed to at least one member selected from the group consisting of air, oxygen, cumene hydroperoxide, and fluoroolefin polyperoxides, peroxides, hydroperoxides, persulfates, percarbonates, perborates and hydropersulfatees before said contacting.

Another embodiment of the invention relates to any of the foregoing methods that employs any of the foregoing refrigerant compositions for heating or cooling.

Another embodiment of the invention relates to a container with a refrigerant comprising any of the foregoing refrigerant compositions.

The embodiments of the invention can be used alone or in combinations with each other, and that different embodiments can be combined and form part of the invention.

DETAILED DESCRIPTION OF THE INVENTION

Figure 1:
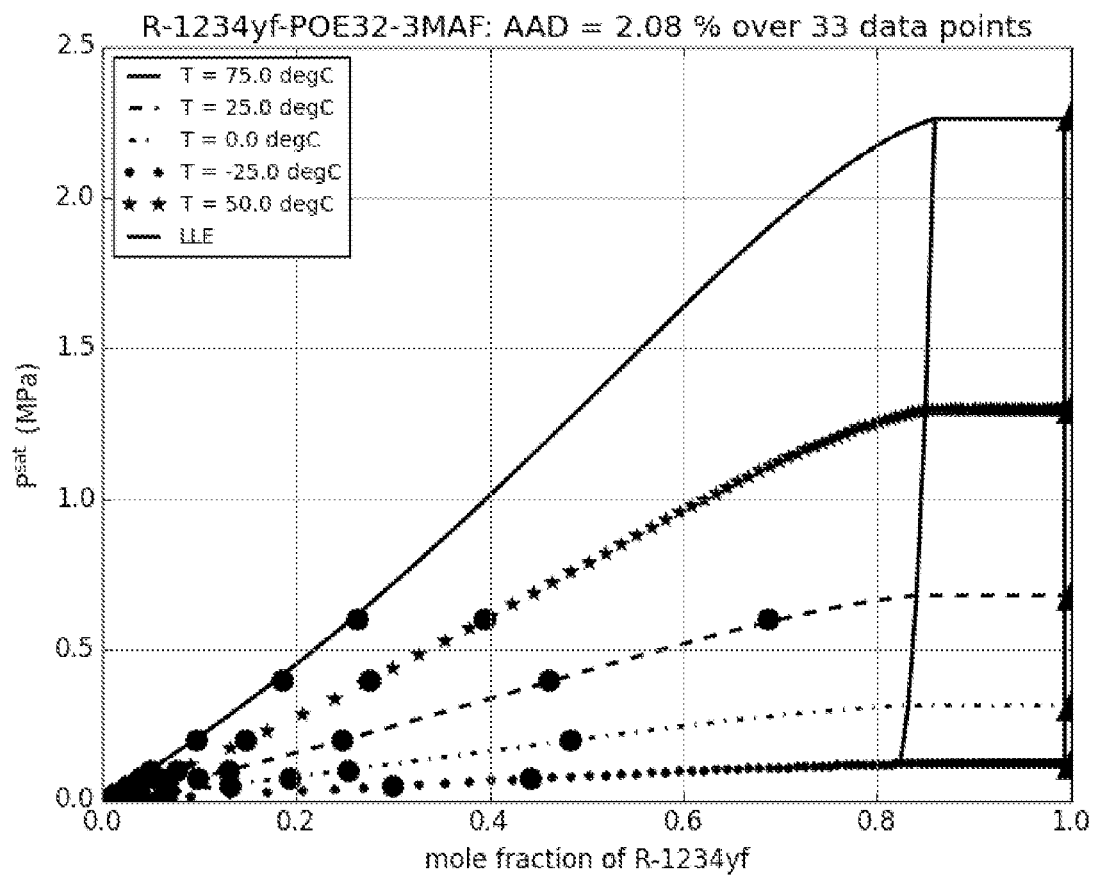
FIG. 1 is a graphical representation of NRTL fit to experimental VLE of R-1234yf/lubricant

The present invention provides a stabilized refrigerant composition comprising at least one fluoroolefin, at least one lubricant and an effective amount of at least one inhibitor wherein the inhibitor is present in a liquid fluoroolefin as well as the lubricant. By "stabilized" it is meant to refer to a composition comprising an effective amount of at least one inhibitor compound that inhibits, if not eliminates a fluoroolefin from interacting with another compound and forming dimers, oligomers, homopolymers or polymeric products. Examples of such compounds that can cause such interactions include oxidizers such as air, oxygen, cumene hydroperoxide, and fluoroolefin polyperoxides, peroxides, hydroperoxides, persulfates, percarbonates, perborates. hydropersulfatees among other initiators. Initiator compounds can be present in an amount from about 10 to about 15,000 ppm by weight, about 1,000 to about 10,000 ppm and in some cases about 1,000 to about 3,000 ppm and in some embodiments 30 to 2,000 ppm. Such initiator compounds can be present as contaminants in at least one of conduits, lines and other systems used for handling the fluoroolefin containing refrigerant compositions; packaging (containers), and a refrigeration, air-conditioning or heat pump system. Without wishing to be bound by any theory or explanation it is believed that certain contaminants can function as radical initiators thereby causing the fluoroolefin to oligomerization, homopolymerization or form other polymeric products.

In one embodiment of the invention, the inventive refrigerant compositions are substantially fre

TABLE 1

| Code | Structure | Chemical Name |
|---|---|---|
| F11E | $CF_3CH=CHCF_3$ | 1,1,1,4,4,4-hexafluorobut-2-ene |
| F12E | $CF_3CH=CHC_2F_5$ | 1,1,1,4,4,5,5,5-octafluoropent-2-ene |
| F13E | $CF_3CH=CHCF_2C_2F_5$ | 1,1,1,4,4,5,5,6,6,6-decafluorohex-2-ene |
| F13iE | $CF_3CH=CHCF(CF_3)_2$ | 1,1,1,4,5,5,5-heptafluoro-4-(trifluoromethyl)pent-2-ene |
| F22E | $C_2F_5CH=CHC_2F_5$ | 1,1,1,2,2,5,5,6,6,6-decafluorohex-3-ene |
| F14E | $CF_3CH=CH(CF_2)_3CF_3$ | 1,1,1,4,4,5,5,6,6,7,7-dodecafluorohept-2-ene |
| F14iE | $CF_3CH=CHCF_2CF—(CF_3)_2$ | 1,1,1,4,4,5,6,6,6-nonafluoro-5-(trifluoromethyl)hex-2-ene |
| F14sE | $CF_3CH=CHCF(CF_3)—C2F_5$ | 1,1,1,4,5,5,6,6,6-nonfluoro-4-(trifluoromethyl)hex-2-ene |
| F14tE | $CF_3CH=CHC(CF_3)_3$ | 1,1,1,5,5,5-hexafluoro-4,4-bis(trifluoromethyl)pent-2-ene |
| F23E | $C_2F_5CH=CHCF_2C_2F_5$ | 1,1,1,2,2,5,5,6,6,7,7,7-dodecafluorohept-3-ene |
| F23iE | $C_2F_5CH=CHCF(CF_3)_2$ | 1,1,1,2,2,5,6,6,6-nonfluoro-5-(trifluoromethyl)hex-3-ene |
| F15E | $CF_3CH=CH(CF_2)_4CF_3$ | 1,1,1,4,4,5,5,6,6,7,7,8,8,8-tetradecafluorooct-2-ene |
| F15iE | $CF_3CH=CH—CF_2CF_2CF(CF_3)_2$ | 1,1,1,4,4,5,5,6,7,7,7-undecafluoro-6-(trifluoromethyl)hept-2-ene |

TABLE 1-continued

| Code | Structure | Chemical Name |
|---|---|---|
| F15tE | $CF_3CH=CH-C(CF_3)_2C_2F_5$ | 1,1,1,5,5,6,6,6-octafluoro-4,4-bis(trifluoromethyl)hex-2-ene |
| F24E | $C_2F_5CH=CH(CF_2)_3CF_3$ | 1,1,1,2,2,5,5,6,6,7,7,8,8,8-tetradecafluorooct-3-ene |
| F24iE | $C_2F_5CH=CHCF_2CF-(CF_3)_2$ | 1,1,1,2,2,5,5,6,7,7,7-undecafluoro-6-(trifluoromethyl)hept-3-ene |
| F24sE | $C_2F_5CH=CHCF(CF_3)-C2F_5$ | 1,1,1,2,2,5,6,6,7,7,7-undecafluoro-5-(trifluoromethyl)hept-3-ene |
| F24tE | $C_2F_5CH=CHC(CF_3)_3$ | 1,1,1,2,2,6,6,6-octafluoro-5,5-bis(trifluoromethyl)hex-3-ene |
| F33E | $C_2F_5CF_2CH=CH-CF_2C_2F_5$ | 1,1,1,2,2,3,3,6,6,7,7,8,8,8-tetradecafluorooct-4-ene |
| F3i3iE | $(CF_3)_2CFCH=CH-CF(CF_3)_2$ | 1,1,1,2,5,6,6,6-octafluoro-2,5-bis(trifluoromethyl)hex-3-ene |
| F33iE | $C_2F_5CF_2CH=CH-CF(CF_3)_2$ | 1,1,1,2,5,5,6,6,7,7,7-undecafluoro-2-(trifluoromethyl)hept-3-ene |
| F16E | $CF_3CH=CH(CF2)_5CF_3$ | 1,1,1,4,4,5,5,6,6,7,7,8,8,,9,9,9-hexadecafluoronon-2-ene |
| F16sE | $CF_3CH=CHCF(CF_3)(CF_2)_2C_2F_5$ | 1,1,1,4,5,5,6,6,7,7,8,8,8-tridecafluoro-4-(trifluoromethyl)hept-2-ene |
| F16tE | $CF_3CH=CHC(CF_3)_2CF_2C_2F_5$ | 1,1,1,6,6,6-octafluoro-4,4-bis(trifluoromethyl)hept-2-ene |
| F25E | $C_2F_5CH=CH(CF_2)_4CF_3$ | 1,1,1,2,2,5,5,6,6,7,7,8,8,9,9,9-hexadecafluoronon-3-ene |
| F25iE | $C_2F_5CH=CH-CF_2CF_2CF(CF3)_2$ | 1,1,1,2,2,5,5,6,6,7,8,8,8-tridecafluoro-7-(trifluoromethyl)oct-3-ene |
| F25tE | $C_2F_5CH=CH-C(CF_3)_2C_2F_5$ | 1,1,1,2,2,6,6,7,7,7-decafluoro-5,5-bis(trifluoromethyl)hept-3-ene |
| F34E | $C_2F_5CF_2CH=CH-(CF_2)_3CF_3$ | 1,1,1,2,2,3,3,6,6,7,7,8,8,9,9,9-hexadecafluoronon-4-ene |
| F34iE | $C_2F_5CF_2CH=CH-CF_2CF(CF_3)_2$ | 1,1,1,2,2,3,3,6,6,7,8,8,8-tridecafluoro-7-(trifluoromethyl)oct-4-ene |
| F34sE | $C_2F5CF_2CH=CH-CF(CF_3)C_2F_5$ | 1,1,1,2,2,3,3,6,7,7,8,8,8-tridecafluoro-6-(trifluoromethyl)oct-4-ene |
| F34tE | $C_2F_5CF_2CH=CH-C(CF_3)_3$ | 1,1,1,5,5,6,6,7,7,7-decafluoro-2,2-bis(trifluoromethyl)hept-3-ene |
| F3i4E | $(CF_3)_2CFCH=CH-(CF_2)_3CF_3$ | 1,1,1,2,5,5,6,6,7,7,8,8,8-tridecafluoro-2(trifluoromethyl)oct-3-ene |
| F3i4iE | $(CF_3)_2CFCH=CH-CF_2CF(CF_3)_2$ | 1,1,1,2,5,5,6,6,7,7,7-decafluoro-2,6-bis(trifluoromethyl)hept-3-ene |
| F3i4sE | $(CF_3)_2CFCH=CH-CF(CF_3)C_2F_5$ | 1,1,1,2,5,6,6,7,7,7-decafluoro-2,5-bis(trifluoromethyl)hept-3-ene |
| F3i4tE | $(CF_3)_2CFCH=CH-C(CF_3)_3$ | 1,1,1,2,6,6,6-heptafluoro-2,5,5-tris(trifluoromethyl)hex-3-ene |
| F26E | $C_2F_5CH=CH(CF_2)_5CF_3$ | 1,1,1,2,2,5,5,6,6,7,7,8,8,9,9,10,10,10-octadecafluorodec-3-ene |
| F26SE | $C_2F_5CH=CHCF(CF_3)(CF_2)_2C_2F_5$ | 1,1,1,2,2,5,6,6,7,7,8,8,9,9,9-pentadecafluoro-5-(trifluoromethyl)non-3-ene |
| F26tE | $C_2F_5CH=CHC(CF_3)_2CF_2C_2F_5$ | 1,1,1,2,2,6,6,7,7,8,8,8-dodecafluoro-5,5-bis(trifluoromethyl)oct-3-ene |
| F35E | $C_2F_5CF_2CH=CH-(CF_2)_4CF_3$ | 1,1,1,2,2,3,3,6,6,7,7,8,8,9,9,10,10,10-octadecafluorodec-4-ene |
| F35iE | $C_2F_5CF_2CH=CH-CF_2CF_2CF(CF_3)_2$ | 1,1,1,2,2,3,3,6,6,7,7,8,8,9,9,9-pentadecafluoro-8-(trifluoromethyl)non-4-ene |
| F35tE | $C_2F_5CF_2CH=CH-C(CF_3)_2C_2F_5$ | 1,1,1,2,2,3,3,7,7,8,8,8-dodecafluoro-6,6-bis(trifluoromethyl)oct-4-ene |
| F3i5E | $(CF_3)_2CFCH=CH-(CF_2)_4CF_3$ | 1,1,1,2,5,5,6,6,7,7,8,8,9,9,9-pentadecafluoro-2-(trifluoromethyl)non-3-ene |
| F3i5iE | $(CF_3)_2CFCH=CH-CF_2CF_2CF(CF_3)_2$ | 1,1,1,2,5,5,6,6,7,8,8,8-dodecafluoro-2,7-bis(trifluoromethyl)oct-3-ene |
| F3i5tE | $(CF_3)_2CFCH=CH-C(CF_3)_2C_2F_5$ | 1,1,1,2,6,6,7,7,7-nonafluoro-2,5,5-tris(trifluoromethyl)hept-3-ene |
| F44E | $CF_3(CF_2)_3CH=CH-(CF_2)_3CF_3$ | 1,1,1,2,2,3,3,4,4,7,7,8,8,9,9,10,10,10-octadecafluorodec-5-ene |
| F44iE | $CF_3(CF_2)_3CH=CH-CF_2CF(CF_3)_2$ | 1,1,1,2,3,3,6,6,7,7,8,8,9,9,9-pentadecafluoro-2-(trifluoromethyl)non-4-ene |
| F44sE | $CF_3(CF_2)_3CH=CH-CF(CF_3)C2F_5$ | 1,1,1,2,2,3,6,6,7,7,8,8,9,9,9-pentadecafluoro-3-(trifluoromethyl)non-4-ene |
| F44tE | $CF_3(CF_2)_3CH=CH-C(CF_3)_3$ | 1,1,1,5,5,6,6,7,7,8,8,8-dodecafluoro-2,2,-bis(trifluoromethyl)oct-3-ene |
| F4i4iE | $(CF_3)_2CFCF_2CH=CH-CF_2CF(CF_3)_2$ | 1,1,1,2,3,3,6,6,7,8,8,8-dodecafluoro-2,7-bis(trifluoromethyl)oct-4-ene |
| F4i4sE | $(CF_3)_2CFCF_2CH=CH-CF(CF3)C_2F_5$ | 1,1,1,2,3,3,6,7,7,8,8,8-dodecafluoro-2,6-bis(trifluoromethyl)oct-4-ene |
| F4i4tE | $(CF_3)_2CFCF_2CH=CH-C(CF_3)_3$ | 1,1,1,5,5,6,7,7,7-nonafluoro-2,6,6-tris(trifluoromethyl)hept-3-ene |
| F4s4sE | $C_2F_5CF(CF_3)CH=CH-CF(CF_3)C_2F_5$ | 1,1,1,2,2,3,6,7,7,8,8,8-dodecafluoro-3,6-bis(trifluoromethyl)oct-4-ene |

TABLE 1-continued

| Code | Structure | Chemical Name |
|---|---|---|
| F4s4tE | $C_2F_5CF(CF_3)CH=CH—C(CF_3)_3$ | 1,1,1,5,6,6,7,7,7-nonafluoro-2,2,5-tris(trifluoromethyl)hept-3-ene |
| F4t4tE | $(CF_3)_3CCH=CH—C(CF_3)_3$ | 1,1,1,6,6,6-hexafluoro-2,2,5,5-tetrakis(trifluoromethyl)hex-3-ene |

Compounds of Formula I may be prepared by contacting a perfluoroalkyl iodide of the formula $R^1I$ with a perfluoroalkyltrihydroolefin of the formula $R^2CH=CH_2$ to form a trihydroiodoperfluoroalkane of the formula $R^1CH_2CHIR^2$. This trihydroiodoperfluoroalkane can then be dehydroiodinated to form $R^1CH=CHR^2$. Alternatively, the olefin $R^1CH=CHR^2$ may be prepared by dehydroiodination of a trihydroiodoperfluoroalkane of the formula $R^1CHICH_2R^2$ formed in turn by reacting a perfluoroalkyl iodide of the formula $R^2I$ with a perfluoroalkyltrihydroolefin of the formula $R^1CH=CH_2$.

Said contacting of a perfluoroalkyl iodide with a perfluoroalkyltrihydroolefin may take place in batch mode by combining the reactants in a suitable reaction vessel capable of operating under the autogenous pressure of the reactants and products at reaction temperature. Suitable reaction vessels include fabricated from stainless steels, in particular of the austenitic type, and the well-known high nickel alloys such as Monel® nickel-copper alloys, Hastelloy® nickel-based alloys and Inconel® nickel-chromium alloys.

Alternatively, the reaction may take be conducted in semi-batch mode in which the perfluoroalkyltrihydroolefin reactant is added to the perfluoroalkyl iodide reactant by means of a suitable addition apparatus such as a pump at the reaction temperature.

The ratio of perfluoroalkyl iodide to perfluoroalkyltrihydroolefin should be between about 1:1 to about 4:1, preferably from about 1.5:1 to 2.5:1. Ratios less than 1.5:1 tend to result in large amounts of the 2:1 adduct as reported by Jeanneaux, et. al. in Journal of Fluorine Chemistry, Vol. 4, pages 261-270 (1974).

Preferred temperatures for contacting of said perfluoroalkyl iodide with said perfluoroalkyltrihydroolefin are preferably within the range of about 150° C. to 300° C., preferably from about 170° C. to about 250° C., and most preferably from about 180° C. to about 230° C. Suitable contact times for the reaction of the perfluoroalkyl iodide with the perfluoroalkyltrihydroolefin are from about 0.5 hour to 18 hours, preferably from about 4 to about 12 hours.

The trihydroiodoperfluoroalkane prepared by reaction of the perfluoroalkyl iodide with the perfluoroalkyltrihydroolefin may be used directly in the dehydroiodination step or may preferably be recovered and purified by distillation prior to the dehydroiodination step.

The dehydroiodination step is carried out by contacting the trihydroiodoperfluoroalkane with a basic substance. Suitable basic substances include alkali metal hydroxides (e.g., sodium hydroxide or potassium hydroxide), alkali metal oxide (for example, sodium oxide), alkaline earth metal hydroxides (e.g., calcium hydroxide), alkaline earth metal oxides (e.g., calcium oxide), alkali metal alkoxides (e.g., sodium methoxide or sodium ethoxide), aqueous ammonia, sodium amide, or mixtures of basic substances such as soda lime. Preferred basic substances are sodium hydroxide and potassium hydroxide. Said contacting of the trihydroiodoperfluoroalkane with a basic substance may take place in the liquid phase preferably in the presence of a solvent capable of dissolving at least a portion of both reactants. Solvents suitable for the dehydroiodination step include one or more polar organic solvents such as alcohols (e.g., methanol, ethanol, n-propanol, isopropanol, n-butanol, isobutanol, and tertiary butanol), nitriles (e.g., acetonitrile, propionitrile, butyronitrile, benzonitrile, or adiponitrile), dimethyl sulfoxide, N,N-dimethylformamide, N,N-dimethylacetamide, or sulfolane. The choice of solvent may depend on the boiling point product and the ease of separation of traces of the solvent from the product during purification. Typically, ethanol or isopropanol are good solvents for the reaction.

Typically, the dehydroiodination reaction may be carried out by addition of one of the reactants (either the basic substance or the trihydroiodoperfluoroalkane) to the other reactant in a suitable reaction vessel. Said reaction may be fabricated from glass, ceramic, or metal and is preferably agitated with an impeller or stirring mechanism.

Temperatures suitable for the dehydroiodination reaction are from about 10° C. to about 100° C., preferably from about 20° C. to about 70° C. The dehydroiodination reaction may be carried out at ambient pressure or at reduced or elevated pressure. Of note are dehydroiodination reactions in which the compound of Formula I is distilled out of the reaction vessel as it is formed.

Alternatively, the dehydroiodination reaction may be conducted by contacting an aqueous solution of said basic substance with a solution of the trihydroiodoperfluoroalkane in one or more organic solvents of lower polarity such as an alkane (e.g., hexane, heptane, or octane), aromatic hydrocarbon (e.g., toluene), halogenated hydrocarbon (e.g., methylene chloride, chloroform, carbon tetrachloride, or perchloroethylene), or ether (e.g., diethyl ether, methyl tert-butyl ether, tetrahydrofuran, 2-methyl tetrahydrofuran, dioxane, dimethoxyethane, diglyme, or tetraglyme) in the presence of a phase transfer catalyst. Suitable phase transfer catalysts include quaternary ammonium halides (e.g., tetrabutylammonium bromide, tetrabutylammonium hydrosulfate, triethylbenzylammonium chloride, dodecyltrimethylammonium chloride, and tricaprylylmethylammonium chloride), quaternary phosphonium halides (e.g., triphenylmethylphosphonium bromide and tetraphenylphosphonium chloride), or cyclic polyether compounds known in the art as crown ethers (e.g., 18-crown-6 and 15-crown-5).

Alternatively, the dehydroiodination reaction may be conducted in the absence of solvent by adding the trihydroiodoperfluoroalkane to a solid or liquid basic substance.

Suitable reaction times for the dehydroiodination reactions are from about 15 minutes to about six hours or more depending on the solubility of the reactants. Typically the dehydroiodination reaction is rapid and requires about 30 minutes to about three hours for completion.

The compound of Formula I may be recovered from the dehydroiodination reaction mixture by phase separation after addition of water, by distillation, or by a combination thereof.

In another embodiment of the present invention, fluoroolefins comprise cyclic fluoroolefins (cyclo-$[CX=CY(CZVV)_n-]$ (Formula II) wherein X, Y, Z, and W are independently selected from H and F, and n is an integer from 2 to 5). In one embodiment the fluoroolefins of Formula II, have at least about 3 carbon atoms in the molecule. In another embodiment, the fluoroolefins of Formula II have at least about 4 carbon atoms in the molecule. In yet another embodiment, the fluoroolefins of Formula II have at least about 5 carbon atoms in the molecule. Representative cyclic fluoroolefins of Formula II are listed in Table 2.

TABLE 2

| Cyclic fluoroolefins | Structure | Chemical name |
|---|---|---|
| FC-C1316cc | cyclo-$CF_2CF_2CF=CF-$ | 1,2,3,3,4,4-hexafluorocyclobutene |
| HFC-C1334cc | cyclo-$CF_2CF_2CH=CH-$ | 3,3,4,4-tetrafluorocyclobutene |
| HFC-C1436 | cyclo-$CF_2CF_2CF_2CH=CH-$ | 3,3,4,4,5,5,-hexafluorocyclopentene |
| FC-C1418y | cyclo-$CF_2CF=CFCF_2CF_2-$ | 1,2,3,3,4,4,5,5-octafluorocyclopentene |
| FC-C151-10y | cyclo-$CF_2CF=CFCF_2CF_2CF_2-$ | 1,2,3,3,4,4,5,5,6,6-decafluorocyclohexene |

The refrigerant compositions of the present invention may comprise a single compound of Formula I or Formula II, for example, one of the compounds in Table 1 or Table 2 or may comprise a combination of compounds of Formula I or Formula II.

In another embodiment, fluoroolefins may comprise those compounds listed in Table 3.

TABLE 3

| Name | Structure | Chemical name |
|---|---|---|
| HFO-1225ye | $CF_3CF=CHF$ | 1,2,3,3,3-pentafluoro-1-propene |
| HFO-1225zc | $CF_3CH=CF_2$ | 1,1,3,3,3-pentafluoro-1-propene |
| HFO-1225yc | $CHF_2CF=CF_2$ | 1,1,2,3,3-pentafluoro-1-propene |
| HFO-1234ye | $CHF_2CF=CHF$ | 1,2,3,3-tetrafluoro-1-propene |
| HFO-1234yf | $CF_3CF=CH_2$ | 2,3,3,3-tetrafluoro-1-propene |
| HFO-1234ze | $CF_3CH=CHF$ | 1,3,3,3-tetrafluoro-1-propene |
| HFO-1234yc | $CH_2FCF=CF_2$ | 1,1,2,3-tetrafluoro-1-propene |
| HFO-1234zc | $CHF_2CH=CF_2$ | 1,1,3,3-tetrafluoro-1-propene |
| HFO-1243yf | $CHF_2CF=CH_2$ | 2,3,3-trifluoro-1-propene |
| HFO-1243zf | $CF_3CH=CH_2$ | 3,3,3-trifluoro-1-propene |
| HFO-1243yc | $CH_3CF=CF_2$ | 1,1,2-trifluoro-1-propene |
| HFO-1243zc | $CH_2FCH=CF_2$ | 1,1,3-trifluoro-1-propene |
| HFO-1243ye | $CH_2FCF=CHF$ | 1,2,3-trifluoro-1-propene |
| HFO-1243ze | $CHF_2CH=CHF$ | 1,3,3-trifluoro-1-propene |
| FC-1318my | $CF_3CF=CFCF_3$ | 1,1,1,2,3,4,4,4-octafluoro-2-butene |
| FC-1318cy | $CF_3CF_2CF=CF_2$ | 1,1,2,3,3,4,4,4-octafluoro-1-butene |
| HFO-1327my | $CF_3CF=CHCF_3$ | 1,1,1,2,4,4,4-heptafluoro-2-butene |
| HFO-1327ye | $CHF=CFCF_2CF_3$ | 1,2,3,3,4,4,4-heptafluoro-1-butene |
| HFO-1327py | $CHF_2CF=CFCF_3$ | 1,1,1,2,3,4,4-heptafluoro-2-butene |
| HFO-1327et | $(CF_3)_2C=CHF$ | 1,3,3,3-tetrafluoro-2-(trifluoromethyl)-1-propene |
| HFO-1327cz | $CF_2=CHCF_2CF_3$ | 1,1,3,3,4,4,4-heptafluoro-1-butene |
| HFO-1327cye | $CF_2=CFCHFCF_3$ | 1,1,2,3,4,4,4-heptafluoro-1-butene |
| HFO-1327cyc | $CF_2=CFCF_2CHF_2$ | 1,1,2,3,3,4,4-heptafluoro-1-butene |
| HFO-1336yf | $CF_3CF_2CF=CH_2$ | 2,3,3,4,4,4-hexafluoro-1-butene |
| HFO-1336ze | $CHF=CHCF_2CF_3$ | 1,3,3,4,4,4-hexafluoro-1-butene |
| HFO-1336eye | $CHF=CFCHFCF_3$ | 1,2,3,4,4,4-hexafluoro-1-butene |
| HFO-1336eyc | $CHF=CFCF_2CHF_2$ | 1,2,3,3,4,4-hexafluoro-1-butene |
| HFO-1336pyy | $CHF_2CF=CFCHF_2$ | 1,1,2,3,4,4-hexafluoro-2-butene |
| HFO-1336qy | $CH_2FCF=CFCF_3$ | 1,1,1,2,3,4-hexafluoro-2-butene |
| HFO-1336pz | $CHF_2CH=CFCF_3$ | 1,1,1,2,4,4-hexafluoro-2-butene |
| HFO-1336mzy | $CF_3CH=CFCHF_2$ | 1,1,1,3,4,4-hexafluoro-2-butene |
| HFO-1336qc | $CF_2=CFCF_2CH_2F$ | 1,1,2,3,3,4-hexafluoro-1-butene |
| HFO-1336pe | $CF_2=CFCHFCHF_2$ | 1,1,2,3,4,4-hexafluoro-1-butene |
| HFO-1336ft | $CH_2=C(CF_3)_2$ | 3,3,3-trifluoro-2-(trifluoromethyl)-1-propene |
| HFO-1345qz | $CH_2FCH=CFCF_3$ | 1,1,1,2,4-pentafluoro-2-butene |
| HFO-1345mzy | $CF_3CH=CFCH_2F$ | 1,1,1,3,4-pentafluoro-2-butene |
| HFO-1345fz | $CF_3CF_2CH=CH_2$ | 3,3,4,4,4-pentafluoro-1-butene |
| HFO-1345mzz | $CHF_2CH=CHCF_3$ | 1,1,1,4,4-pentafluoro-2-butene |
| HFO-1345sy | $CH_3CF=CFCF_3$ | 1,1,1,2,3-pentafluoro-2-butene |
| HFO-1345fyc | $CH_2=CFCF_2CHF_2$ | 2,3,3,4,4-pentafluoro-1-butene |
| HFO-1345pyz | $CHF_2CF=CHCHF_2$ | 1,1,2,4,4-pentafluoro-2-butene |
| HFO-1345cyc | $CH_3CF_2CF=CF_2$ | 1,1,2,3,3-pentafluoro-1-butene |
| HFO-1345pyy | $CH_2FCF=CFCHF_2$ | 1,1,2,3,4-pentafluoro-2-butene |
| HFO-1345eyc | $CH_2FCF_2CF=CF_2$ | 1,2,3,3,4-pentafluoro-1-butene |
| HFO-1345ctm | $CF2=C(CF_3)(CH_3)$ | 1,1,3,3,3-pentafluoro-2-methyl-1-propene |
| HFO-1345ftp | $CH_2=C(CHF_2)(CF_3)$ | 2-(difluoromethyl)-3,3,3-trifluoro-1-propene |
| HFO1345fye | $CH_2=CFCHFCF_3$ | 2,3,4,4,4-pentafluoro-1-butene |
| HFO-1345eyf | $CHF=CFCH_2CF_3$ | 1,2,4,4,4-pentafluoro-1-butene |
| HFO-1345eze | $CHF=CHCHFCF_3$ | 1,3,4,4,4-pentafluoro-1-butene |
| HFO-1345ezc | $CHF=CHCF_2CHF_2$ | 1,3,3,4,4-pentafluoro-1-butene |
| HFO-1345eye | $CHF=CFCHFCHF_2$ | 1,2,3,4,4-pentafluoro-1-butene |

TABLE 3-continued

| Name | Structure | Chemical name |
|---|---|---|
| HFO-1354fzc | CH$_2$=CHCF$_2$CHF$_2$ | 3,3,4,4-tetrafluoro-1-butene |
| HFO-1354ctp | CF$_2$=C(CHF$_2$)(CH$_3$) | 1,1,3,3-tetrafluoro-2-methyl-1-propene |
| HFO-1354etm | CHF=C(CF$_3$)(CH$_3$) | 1,3,3,3-tetrafluoro-2-methyl-1-propene |
| HFO-1354tfp | CH$_2$=C(CHF$_2$)$_2$ | 2-(difluoromethyl)-3,3-difluoro-1-propene |
| HFO-1354my | CF$_3$CF=CHCH$_3$ | 1,1,1,2-tetrafluoro-2-butene |
| HFO-1354mzy | CH$_3$CF=CHCF$_3$ | 1,1,1,3-tetrafluoro-2-butene |
| FC-141-10myy | CF$_3$CF=CFCF$_2$CF$_3$ | 1,1,1,2,3,4,4,5,5,5-decafluoro-2-pentene |
| FC-141-10cy | CF$_2$=CFCF$_2$CF$_2$CF$_3$ | 1,1,2,3,3,4,4,5,5,5-decafluoro-1-pentene |
| HFO-1429mzt | (CF$_3$)$_2$C=CHCF$_3$ | 1,1,1,4,4,4-hexafluoro-2-(trifluoromethyl)-2-butene |
| HFO-1429myz | CF$_3$CF=CHCF$_2$CF$_3$ | 1,1,1,2,4,4,5,5,5-nonafluoro-2-pentene |
| HFO-1429mzy | CF$_3$CH=CFCF$_2$CF$_3$ | 1,1,1,3,4,4,5,5,5-nonafluoro-2-pentene |
| HFO-1429eyc | CHF=CFCF$_2$CF$_2$CF$_3$ | 1,2,3,3,4,4,5,5,5-nonafluoro-1-pentene |
| HFO-1429czc | CF$_2$=CHCF$_2$CF$_2$CF$_3$ | 1,1,3,3,4,4,5,5,5-nonafluoro-1-pentene |
| HFO-1429cycc | CF$_2$=CFCF$_2$CF$_2$CHF$_2$ | 1,1,2,3,3,4,4,5,5-nonafluoro-1-pentene |
| HFO-1429pyy | CHF$_2$CF=CFCF$_2$CF$_3$ | 1,1,2,3,4,4,5,5,5-nonafluoro-2-pentene |
| HFO-1429myyc | CF$_3$CF=CFCF$_2$CHF$_2$ | 1,1,1,2,3,4,4,5,5-nonafluoro-2-pentene |
| HFO-1429myye | CF$_3$CF=CFCHFCF$_3$ | 1,1,1,2,3,4,5,5,5-nonafluoro-2-pentene |
| HFO-1429eyym | CHF=CFCF(CF$_3$)$_2$ | 1,2,3,4,4,4-hexafluoro-3-(trifluoromethyl)-1-butene |
| HFO-1429cyzm | CF$_2$=CFCH(CF3)$_2$ | 1,1,2,4,4,4-hexafluoro-3-(trifluoromethyl)-1-butene |
| HFO-1429mzt | CF$_3$CH=C(CF$_3$)$_2$ | 1,1,1,4,4,4-hexafluoro-2-(trifluoromethyl)-2-butene |
| HFO-1429czym | CF$_2$=CHCF(CF$_3$)$_2$ | 1,1,3,4,4,4-hexafluoro-3-(trifluoromethyl)-1-butene |
| HFO-1438fy | CH$_2$=CFCF$_2$CF$_2$CF$_3$ | 2,3,3,4,4,5,5,5-octafluoro-1-pentene |
| HFO-1438eycc | CHF=CFCF$_2$CF$_2$CHF$_2$ | 1,2,3,3,4,4,5,5-octafluoro-1-pentene |
| HFO-1438ftmc | CH$_2$=C(CF$_3$)CF$_2$CF$_3$ | 3,3,4,4,4-pentafluoro-2-(trifluoromethyl)-1-butene |
| HFO-1438czzm | CF$_2$=CHCH(CF$_3$)$_2$ | 1,1,4,4,4-pentafluoro-3-(trifluoromethyl)-1-butene |
| HFO-1438ezym | CHF=CHCF(CF3)$_2$ | 1,3,4,4,4-pentafluoro-3-(trifluoromethyl)-1-butene |
| HFO-1438ctmf | CF$_2$=C(CF$_3$)CH$_2$CF$_3$ | 1,1,4,4,4-pentafluoro-2-(trifluoromethyl)-1-butene |
| HFO-1447fzy | (CF$_3$)$_2$CFCH=CH$_2$ | 3,4,4,4-tetrafluoro-3-(trifluoromethyl)-1-butene |
| HFO-1447fz | CF$_3$CF$_2$CF$_2$CH=CH$_2$ | 3,3,4,4,5,5,5-heptafluoro-1-pentene |
| HFO-1447fycc | CH$_2$=CFCF$_2$CF$_2$CHF$_2$ | 2,3,3,4,4,5,5-heptafluoro-1-pentene |
| HFO-1447czcf | CF$_2$=CHCF$_2$CH$_2$CF$_3$ | 1,1,3,3,5,5,5-heptafluoro-1-pentene |
| HFO-1447mytm | CF$_3$CF=C(CF$_3$)(CH$_3$) | 1,1,1,2,4,4,4-heptafluoro-3-methyl-2-butene |
| HFO-1447fyz | CH$_2$=CFCH(CF$_3$)$_2$ | 2,4,4,4-tetrafluoro-3-(trifluoromethyl)-1-butene |
| HFO-1447ezz | CHF=CHCH(CF$_3$)$_2$ | 1,4,4,4-tetrafluoro-3-(trifluoromethyl)-1-butene |
| HFO-1447qzt | CH$_2$FCH=C(CF$_3$)$_2$ | 1,4,4,4-tetrafluoro-2-(trifluoromethyl)-2-butene |
| HFO-1447syt | CH$_3$CF=C(CF$_3$)$_2$ | 2,4,4,4-tetrafluoro-2-(trifluoromethyl)-2-butene |
| HFO-1456szt | (CF$_3$)$_2$C=CHCH$_3$ | 3-(trifluoromethyl)-4,4,4-trifluoro-2-butene |
| HFO-1456szy | CF$_3$CF$_2$CF=CHCH$_3$ | 3,4,4,5,5,5-hexafluoro-2-pentene |
| HFO-1456mstz | CF$_3$C(CH$_3$)=CHCF$_3$ | 1,1,1,4,4,4-hexafluoro-2-methyl-2-butene |
| HFO-1456fzce | CH$_2$=CHCF$_2$CHFCF$_3$ | 3,3,4,5,5,5-hexafluoro-1-pentene |
| HFO-1456ftmf | CH$_2$=C(CF$_3$)CH$_2$CF$_3$ | 4,4,4-trifluoro-2-(trifluoromethyl)-1-butene |
| FC-151-12c | CF$_3$(CF$_2$)$_3$CF=CF$_2$ | 1,1,2,3,3,4,4,5,5,6,6,6-dodecafluoro-1-hexene (or perfluoro-1-hexene) |
| FC-151-12mcy | CF$_3$CF$_2$CF=CFCF$_2$CF$_3$ | 1,1,1,2,2,3,4,5,5,6,6,6-dodecafluoro-3-hexene (or perfluoro-3-hexene) |
| FC-151-12mmtt | (CF$_3$)$_2$C=C(CF$_3$)$_2$ | 1,1,1,4,4,4-hexafluoro-2,3-bis(trifluoromethyl)-2-butene |
| FC-151-12mmzz | (CF$_3$)$_2$CFCF=CFCF$_3$ | 1,1,1,2,3,4,5,5,5-nonafluoro-4-(trifluoromethyl)-2-pentene |
| HFO-152-11mmtz | (CF$_3$)$_2$C=CHC$_2$F$_5$ | 1,1,1,4,4,5,5,5-octafluoro-2-(trifluoromethyl)-2-pentene |
| HFO-152-11mmyyz | (CF$_3$)$_2$CFCF=CHCF$_3$ | 1,1,1,3,4,5,5,5-octafluoro-4-(trifluoromethyl)-2-pentene |
| PFBE (or HFO-1549fz) | CF$_3$CF$_2$CF$_2$CF$_2$CH=CH$_2$ | 3,3,4,4,5,5,6,6,6-nonafluoro-1-hexene (or perfluorobutylethylene) |
| HFO-1549fztmm | CH$_2$=CHC(CF$_3$)$_3$ | 4,4,4-trifluoro-3,3-bis(trifluoromethyl)-1-butene |

TABLE 3-continued

| Name | Structure | Chemical name |
|---|---|---|
| HFO-1549mmtts | $(CF_3)_2C=C(CH_3)(CF_3)$ | 1,1,1,4,4,4-hexafluoro-3-methyl-2-(trifluoromethyl)-2-butene |
| HFO-1549fycz | $CH_2=CFCF_2CH(CF_3)_2$ | 2,3,3,5,5,5-hexafluoro-4-(trifluoromethyl)-1-pentene |
| HFO-1549myts | $CF_3CF=C(CH_3)CF_2CF_3$ | 1,1,1,2,4,4,5,5,5-nonafluoro-3-methyl-2-pentene |
| HFO-1549mzzz | $CF_3CH=CHCH(CF_3)_2$ | 1,1,1,5,5,5-hexafluoro-4-(trifluoromethyl)-2-pentene |
| HFO-1558szy | $CF_3CF_2CF_2CF=CHCH_3$ | 3,4,4,5,5,6,6,6-octafluoro-2-hexene |
| HFO-1558fzccc | $CH_2=CHCF_2CF_2CF_2CHF_2$ | 3,3,4,4,5,5,6,6-octafluoro-2-hexene |
| HFO-1558mmtzc | $(CF_3)_2C=CHCF_2CH_3$ | 1,1,1,4,4-pentafluoro-2-(trifluoromethyl)-2-pentene |
| HFO-1558ftmf | $CH_2=C(CF_3)CH_2C_2F_5$ | 4,4,5,5,5-pentafluoro-2-(trifluoromethyl)-1-pentene |
| HFO-1567fts | $CF_3CF_2CF_2C(CH_3)=CH_2$ | 3,3,4,4,5,5,5-heptafluoro-2-methyl-1-pentene |
| HFO-1567szz | $CF_3CF_2CF_2CH=CHCH_3$ | 4,4,5,5,6,6,6-heptafluoro-2-hexene |
| HFO-1567fzfc | $CH_2=CHCH_2CF_2C_2F_5$ | 4,4,5,5,6,6,6-heptafluoro-1-hexene |
| HFO-1567sfyy | $CF_3CF_2CF=CFC_2H_5$ | 1,1,1,2,2,3,4-heptafluoro-3-hexene |
| HFO-1567fzfy | $CH_2=CHCH_2CF(CF_3)_2$ | 4,5,5,5-tetrafluoro-4-(trifluoromethyl)-1-pentene |
| HFO-1567myzzm | $CF_3CF=CHCH(CF_3)(CH_3)$ | 1,1,1,2,5,5,5-heptafluoro-4-methyl-2-pentene |
| HFO-1567mmtyf | $(CF_3)_2C=CFC_2H_5$ | 1,1,1,3-tetrafluoro-2-(trifluoromethyl)-2-pentene |
| FC-161-14myy | $CF_3CF=CFCF_2CF_2C_2F_5$ | 1,1,1,2,3,4,4,5,5,6,6,7,7,7-tetradecafluoro-2-heptene |
| FC-161-14mcyy | $CF_3CF_2CF=CFCF_2C_2F_5$ | 1,1,1,2,2,3,4,5,5,6,6,7,7,7-tetradecafluoro-2-heptene |
| HFO-162-13mzy | $CF_3CH=CFCF_2CF_2C_2F_5$ | 1,1,1,3,4,4,5,5,6,6,7,7,7-tridecafluoro-2-heptene |
| HFO162-13myz | $CF_3CF=CHCF_2CF_2C_2F_5$ | 1,1,1,2,4,4,5,5,6,6,7,7,7-tridecafluoro-2-heptene |
| HFO-162-13mczy | $CF_3CF_2CH=CFCF_2C_2F_5$ | 1,1,1,2,2,4,5,5,6,6,7,7,7-tridecafluoro-3-heptene |
| HFO-162-13mcyz | $CF_3CF_2CF=CHCF_2C_2F_5$ | 1,1,1,2,2,3,5,5,6,6,7,7,7-tridecafluoro-3-heptene |
| PEVE | $CF_2=CFOCF_2CF_3$ | pentafluoroethyl trifluorovinyl ether |
| PMVE | $CF_2=CFOCF_3$ | trifluoromethyl trifluorovinyl ether |

The compounds listed in Table 2 and Table 3 are available commercially or may be prepared by processes known in the art or as described herein.

1,1,1,4-pentafluoro-2-butene may be prepared from 1,1,1,2,4,4-hexafluorobutane ($CHF_2CH_2CHFCF_3$) by dehydrofluorination over solid KOH in the vapor phase at room temperature. The synthesis of 1,1,1,2,4,4-hexafluorobutane is described in U.S. Pat. No. 6,066,768, incorporated herein by reference.

1,1,1,4,4,4-hexafluoro-2-butene may be prepared from 1,1,1,4,4,4-hexafluoro-2-iodobutane ($CF_3CHICH_2CF_3$) by reaction with KOH using a phase transfer catalyst at about 60° C. The synthesis of 1,1,1,4,4,4-hexafluoro-2-iodobutane may be carried out by reaction of perfluoroethyl iodide ($CF_3I$) and 3,3,3-trifluoropropene ($CF_3CH=CH_2$) at about 200° C. under autogenous pressure for about 8 hours.

3,4,4,5,5,5-hexafluoro-2-pentene may be prepared by dehydrofluorination of 1,1,1,2,2,3,3-heptafluoropentane ($CF_3CF_2CF_2CH_2CH_3$) using solid KOH or over a carbon catalyst at 200-300° C. 1,1,1,2,2,3,3-heptafluoropentane may be prepared by hydrogenation of 3,3,4,4,5,5,5-heptafluoro-1-pentene ($CF_3CF_2CF_2CH=CH_2$).

1,1,1,2,3,4-hexafluoro-2-butene may be prepared by dehydrofluorination of 1,1,1,2,3,3,4-heptafluorobutane ($CH_2FCF_2CHFCF_3$) using solid KOH.

1,1,1,2,4,4-hexafluoro-2-butene may be prepared by dehydrofluorination of 1,1,1,2,2,4,4-heptafluorobutane ($CHF_2CH_2CF_2CF_3$) using solid KOH.

1,1,1,3,4,4-hexafluoro2-butene may be prepared by dehydrofluorination of 1,1,1,3,3,4,4-heptafluorobutane ($CF_3CH_2CF_2CHF_2$) using solid KOH.

1,1,1,2,4-pentafluoro-2-butene may be prepared by dehydrofluorination of 1,1,1,2,2,3-hexafluorobutane ($CH_2FCH_2CF_2CF_3$) using solid KOH.

1,1,1,3,4-pentafluoro-2-butene may be prepared by dehydrofluorination of 1,1,1,3,3,4-hexafluorobutane ($CF_3CH_2CF_2CH_2F$) using solid KOH.

1,1,1,3-tetrafluoro-2-butene may be prepared by reacting 1,1,1,3,3-pentafluorobutane ($CF_3CH_2CF_2CH_3$) with aqueous KOH at 120° C.

1,1,1,4,4,5,5,5-octafluoro-2-pentene may be prepared from ($CF_3CHICH_2CF_2CF_3$) by reaction with KOH using a phase transfer catalyst at about 60° C. The synthesis of 4-iodo-1,1,1,2,2,5,5,5-octafluoropentane may be carried out by reaction of perfluoroethyliodide ($CF_3CF_2I$) and 3,3,3-trifluoropropene at about 200° C. under autogenous pressure for about 8 hours.

1,1,1,2,2,5,5,6,6,6-decafluoro-3-hexene may be prepared from 1,1,1,2,2,5,5,6,6,6-decafluoro-3-iodohexane ($CF_3CF_2CHICH_2CF_2CF_3$) by reaction with KOH using a phase transfer catalyst at about 60° C. The synthesis of 1,1,1,2,2,5,5,6,6,6-decafluoro-3-iodohexane may be carried out by reaction of perfluoroethyliodide ($CF_3CF_2I$) and 3,3,4,4,4-pentafluoro-1-butene ($CF_3CF_2CH=CH_2$) at about 200° C. under autogenous pressure for about 8 hours.

1,1,1,4,5,5,5-heptafluoro-4-(trifluoromethyl)-2-pentene may be prepared by the dehydrofluorination of 1,1,1,2,5,5,5-heptafluoro-4-iodo-2-(trifluoromethyl)-pentane ($CF_3CHICH_2CF(CF_3)2$) with KOH in isopropanol. $CF_3CHICH_2CF(CF_3)_2$ is made from reaction of $(CF_3)_2CFI$ with $CF_3CH=CH_2$ at high temperature, such as about 200° C.

1,1,1,4,4,5,5,6,6,6-decafluoro-2-hexene may be prepared by the reaction of 1,1,1,4,4,4-hexafluoro-2-butene ($CF_3CH=CHCF_3$) with tetrafluoroethylene ($CF_2=CF_2$) and antimony pentafluoride ($SbF_5$).

2,3,3,4,4-pentafluoro-1-butene may be prepared by dehydrofluorination of 1,1,2,2,3,3-hexafluorobutane over fluorided alumina at elevated temperature.

2,3,3,4,4,5,5,5-ocatafluoro-1-pentene may be prepared by dehydroflurination of 2,2,3,3,4,4,5,5,5-nonafluoropentane over solid KOH.

1,2,3,3,4,4,5,5-octafluoro-1-pentene may be prepared by dehydrofluorination of 2,2,3,3,4,4,5,5,5-nonafluoropentane over fluorided alumina at elevated temperature.

2,3,3,3-tetrafluoro-1-propene may be prepared by converting at least one of HCFC-244bb or HFC-245eb into HFO-1234yf.

1,3,3,3-tetrafluoro-1-propene may be prepared by HFC-245fa into HFO-1234ze.

Many of the compounds of Formula I, Formula II, Table 1, Table 2, and Table 3 exist as different configurational isomers or stereoisomers. When the specific isomer is not designated, the present invention is intended to include all single configurational isomers, single stereoisomers, or any combination thereof. For instance, F11E is meant to represent the E-isomer, Z-isomer, or any combination or mixture of both isomers in any ratio. As another example, HFO-1225ye is meant to represent the E-isomer, Z-isomer, or any combination or mixture of both isomers in any ratio.

In one particular embodiment, the fluoroolefin component of the inventive composition comprises HFO-1234yf and/or HFO-1234ze. In another particular embodiment, the fluorolefin comprises HFO-1234yf and/or HFO-1234ze having a purity of greater than 99 wt %, greater than 99.5 wt % pure and in some cases greater than 99.5 to 99, 98 percent pure. In another particular embodiment, the fluorolefin comprises at least 99.5 wt % of 1234yf or 1234ze and less than 0.5 and greater than wt % of the other fluorolefin, less than 0.3 and in some cases less than 0.2.

In another particular embodiment, the fluoroolefin component can comprise the refrigerant compositions disclosed in U.S. Pat. Nos 8,147,709 and 8,877,086; hereby incorporated by reference.

In another particular embodiment, the fluoroolefin component comprises greater than about 99.5 wt % HFO-1234yf and one or more members selected from the group consisting of HFO-1225ye, HFO-1243zf, HFO-1234ze, HFC-236ea, HFC-244bb, HFC-245fa, HFC-245eb, HFC-245cb, 3,3,3-trifluoropropyne, and mixtures thereof. The amount of HFO-1225ye (E/Z isomers) can range from greater than 0 to about 200 ppm by weight, about 1 to about 150 ppm and in some cases about 5to about 50 ppm. The amount of HF01243zf can range from about 0.1 to about 250 ppm, about 10 to about 200ppm and in some cases about 15 to about 150 ppm. The amount of HFO-1234ze (E isomer) can range from about 1 to about 1,500 ppm, about 5 to about 1,000 ppm and in some cases about 50 to 500 ppm. The amount of HFC-236ea can range from about 1 to about 50 ppm, about 5 to about 25 and in some cases about 10 to about 20 ppm. The amount of HFC-245fa, HFC-245eb and/or HFC-245cb can range from about 0 to about 20, about 1 to about 15 and in some cases about 5 to about 10 ppm. The amount of 3,3,3-trifluoropropyne can range from about 0 to about 500 ppm, about 1 to about 300 ppm and in some cases about 5 to about 100 ppm.

In another embodiment, the fluorolefin component comprises HFO-1234yf and at least one additional compound selected from the group consisting of 1114, 1123, 1131a, 1131trans, 1140, 1214ya, 1216, 1224yd, 1225ye(E), 1233zd (E), 1234ze(E), 1252, 143a, 225, 245eb, 254eb, 263fb, CF3CF2I, 236fa, 142b, 244cc, 1223, 1132a, 2316, 1327 isomer, 1336mzzE, 1336 isomer, 1234zeZ and 1224 isomer. In one particular embodiment, the fluorolefin component comprises HFO-1234yf and greater than zero and less than about 1 wt %, less than about 0.5 wt % and in some cases less than 0.25 wt % of additional compounds. In a further embodiment, the inventive inhibitor can used with at least one of HCFO-1233zd and HCFO-1224yd, and refrigerant compositions of blends comprising at least one of HCFO-1233zd and HCFO-1224yd.

Any suitable effective amount of inhibitor may be used in the foregoing refrigerant compositions comprising at least one fluoroolefin. As described herein, the phrase "effective amount" refers to an amount of inhibitor of the present invention which, when added to a composition comprising at least one fluoroolefin, results in a composition wherein the fluoroolefin will not interact with an initiator, and/or degrade to produce as great a reduction in performance, for example, when in use in a cooling apparatus as compared to the composition without an inhibitor and be present in a liquid phase fluoroolefin as well as a lubricant. For cooling apparatus, such effective amounts of inhibitor may be determined by way of testing under the conditions of standard test ASHRAE 97-2007 (RA 2017) In a certain embodiment of the present invention, an effective amount may be said to be that amount of inhibitor that when included as a component of a refrigerant composition comprising at least one fluoroolefin and a lubricant allows a cooling apparatus utilizing said composition comprising at least one fluoroolefin to perform at the same level of refrigeration performance and cooling capacity as if a composition comprising 1,1,1,2-tetrafluoroethane (R-134a), or other standard refrigerant (R-12, R-22, R-502, R-507A, R-508, R401A, R401B, R402A, R402B, R408, R-410A, R-404A, R407C, R-413A, R-417A, R-422A, R-422B, R-422C, R-422D, R-423, R-114, R-11, R-113, R-123, R-124, R236fa, or R-245fa) depending upon what refrigerant may have been used in a similar system in the past, were being utilized as the working fluid.

The instant invention employs effective amounts of at least one of the foregoing inhibitors. While any suitable effective amount can be employed, effective amounts comprise from about 0.001 wt % to about 10 wt %, about 0.01 wt % to about wt %, about 0.3 wt % to about 4 wt %, about 0.3 wt % to about 1 wt % based on the total weight of refrigerant compositions comprising at least one fluoroolefin containing refrigerant compositions as described herein. In one embodiment, an effective amount comprises about 10 to about 2,000 ppm by weight, about 10 to about 1,000 ppm and in some cases about 10 to about 500 ppm of at least one initiator.

In one embodiment of the invention, the inhibitor partitions between the two liquid phases, namely, the liquid phase fluoroolefin and the lubricant. The amount of inhibitor present in the liquid phase of the fluoroolefin can range about 10 to about 80 wt %, about 25 to about 75 wt % and, in some cases, about 45 to about 60 wt % of the inhibitor with the remainder of the inhibitor predominantly present in the lubricant phase.

One embodiment of the invention relates to any of the foregoing refrigerant compositions and further comprising at least one anti-oxidant. While any suitable oxidant can be employed, examples of suitable oxidants comprise at least one member selected from the group consisting of butylated hydroxytoluene, butylated hydroxyanisole, tertiary-butylhydroquinone, gallate, 2-phenyl-2-propanol, 1-(2,4,5-trihydroxyphenyl)-1-butanone, phenolics, bisphenol methane derivatives, 2,2'-methylene bis (4-methyl-6-t-butyl phenol), and combinations thereof. The amount of anti-oxidant can range from about 0.01 to about 5,000 ppm by weight, about 0.03 to about 2000 ppm and in some cases about 0.05 to about 1000 ppm. An example of one particular embodiment relates to using the foregoing anti-oxidant with at least one inhibitor comprising α-terpinene and limonene. An example of one particular embodiment relates to using the foregoing anti-oxidant with an inhibitor comprising at least one of α-terpinene and limonene.

In one embodiment, the foregoing refrigerant compositions of the present invention may further comprise at least one additional compound selected from the group consisting of fluoroolefins (as described previously herein), hydrofluorocarbons, hydrocarbons, dimethyl ether, $CF_3I$, ammonia, carbon dioxide ($CO_2$) and mixtures thereof, meaning mixtures of any of the additional compounds listed in this paragraph. The amount of the additional compound can range from about 1 to about 90% by weight, about 5 to about 75% and in some cases about 10 to about 50%.

In one embodiment, the additional compounds comprise hydrofluorocarbons. The hydrofluorocarbon (HFC) compounds of the present invention comprise saturated compounds containing carbon, hydrogen, and fluorine. Of particular utility are hydrofluorocarbons having 1-7 carbon atoms and having a normal boiling point of from about −90° C. to about 80° C. Hydrofluorocarbons are commercial products available from a number of sources, or may be prepared by methods known in the art. Representative hydrofluorocarbon compounds include but are not limited to fluoromethane ($CH_3F$, HFC-41), difluoromethane ($CH_2F_2$, HFC-32), trifluoromethane ($CHF_3$, HFC-23), pentafluoroethane ($CF_3CHF_2$, HFC-125), 1,1,2,2-tetrafluoroethane ($CHF_2CHF_2$, HFC-134), 1,1,1,2-tetrafluoroethane ($CF_3CH_2F$, HFC-134a), 1,1,1-trifluoroethane ($CF_3CH_3$, HFC-143a), 1,1-difluoroethane ($CHF_2CH_3$, HFC-152a), fluoroethane ($CH_3CH_2F$, HFC-161), 1,1,1,2,2,3,3-heptafluoropropane ($CF_3CF_2CHF_2$, HFC-227ca), 1,1,1,2,3,3,3-heptafluoropropane ($CF_3CHFCF_3$, HFC-227ea), 1,1,2,2,3,3,-hexafluoropropane ($CHF_2CF_2CHF_2$, HFC-236ca), 1,1,1,2,2,3-hexafluoropropane ($CF_3CF_2CH_2F$, HFC-236cb), 1,1,1,2,3,3-hexafluoropropane ($CF_3CHFCHF_2$, HFC-236ea), 1,1,1,3,3,3-hexafluoropropane ($CF_3CH_2CF_3$, HFC-236fa), 1,1,2,2,3-pentafluoropropane ($CHF_2CF_2CH_2F$, HFC-245ca), 1,1,1,2,2-pentafluoropropane ($CF_3CF_2CH_3$, HFC-245cb), 1,1,2,3,3-pentafluoropropane ($CHF_2CHFCHF_2$, HFC-245ea), 1,1,1,2,3-pentafluoropropane ($CF_3CHFCH_2F$, HFC-245eb), 1,1,1,3,3-pentafluoropropane ($CF_3CH_2CHF_2$, HFC-245fa), 1,2,2,3-tetrafluoropropane ($CH_2FCF_2CH_2F$, HFC-254ca), 1,1,2,2-tetrafluoropropane ($CHF_2CF_2CH_3$, HFC-254cb), 1,1,2,3-tetrafluoropropane ($CHF_2CHFCH_2F$, HFC-254ea), 1,1,1,2-tetrafluoropropane ($CF_3CHFCH_3$, HFC-254eb), 1,1,3,3-tetrafluoropropane ($CHF_2CH_2CHF_2$, HFC-254fa), 1,1,1,3-tetrafluoropropane ($CF_3CH_2CH_2F$, HFC-254fb), 1,1,1-trifluoropropane ($CF_3CH_2CH_3$, HFC-263fb), 2,2-difluoropropane ($CH_3CF_2CH_3$, HFC-272ca), 1,2-difluoropropane ($CH_2FCHFCH_3$, HFC-272ea), 1,3-difluoropropane ($CH_2FCH_2CH_2F$, HFC-272fa), 1,1-difluoropropane ($CHF_2CH_2CH_3$, HFC-272fb), 2-fluoropropane ($CH_3CHFCH_3$, HFC-281ea), 1-fluoropropane ($CH_2FCH_2CH_3$, HFC-281fa), 1,1,2,2,3,3,4,4-octafluorobutane ($CHF_2CF_2CF_2CHF_2$, HFC-338pcc), 1,1,1,2,2,4,4,4-octafluorobutane ($CF_3CH_2CF_2CF_3$, HFC-338mf), 1,1,1,3,3-pentafluorobutane ($CF_3CH_2CHF_2$, HFC-365mfc), 1,1,1,2,3,4,4,5,5,5-decafluoropentane ($CF_3CHFCHFCF_2CF_3$, HFC-43-10mee), and 1,1,1,2,2,3,4,5,5,6,6,7,7,7-tetradecafluoroheptane ($CF_3CF_2CHFCHFCF_2CF_2CF_3$, HFC-63-14mee).

In another embodiment, the additional compounds comprise hydrocarbons. The hydrocarbons of the present invention comprise compounds having only carbon and hydrogen. Of particular utility are compounds having 3-7 carbon atoms. Hydrocarbons are commercially available through numerous chemical suppliers. Representative hydrocarbons include but are not limited to propane, n-butane, isobutane, cyclobutane, n-pentane, 2-methylbutane, 2,2-dimethylpropane, cyclopentane, n-hexane, 2-methylpentane, 2,2-dimethylbutane, 2,3-dimethylbutane, 3-methylpentane, cyclohexane, n-heptane, and cycloheptane.

In another embodiment, additional compounds comprise hydrocarbons containing heteroatoms, such as dimethylether (DME, $CH_3OCH_3$. DME is commercially available.

In another embodiment, additional compounds comprise iodotrifluoromethane ($CF_3I$), which is commercially available from various sources or may be prepared by methods known in the art.

In another embodiment, additional compounds comprise carbon dioxide ($CO_2$), which is commercially available from various sources or may be prepared by methods known in the art. In general, any suitable additional compound can be employed so long as the amount of additional compound does not preclude the previously described partitioning of the inhibitor between the liquid phase fluoolefin and lubricant.

In another embodiment, the foregoing refrigerant compositions of the present invention are substantially free of additional compounds and, in particular, substantially free of at least one of dimethyl ether, $CF_3I$, ammonia, and carbon dioxide. In one preferred aspect of this embodiment, the foregoing refrigerant compositions are substantially free of $CF_3I$. By "substantially free of additional compounds" it is meant that the refrigerant compositions as well as the inhibitor comprise less than about 10%, usually less than about 5% and in some cases 0% of the additional compounds.

Of particular note are refrigerant compositions comprising HFO-1234yf and/or HFO-1234ze and additional compounds comprising : HFO-1225ye and HFC-32; HFO-1225ye and HFC-134a; HFO-1225ye, HFC-134a, and HFC-32; HFO-1225ye and HFO-1234yf; HFO-1225ye, HFC-32; HFO-1225ye, HFO-1225ye, and HFC-125. Further refrigerant compositions comprise a blend of at least one of HFO-1234yf and HFO-1234ze as well as i) 134a, 32 and 125; ii) 134a; iii) 227ea; iv) 236fa; and v) 134.

In other embodiments of the invention, the fluoroolefin component of the refrigerant compositions comprises at least about 99 mass % HFO-1234yf and greater than 0 but less than 1 mass % of at least one member selected from the group consisting of HFC-134a, HFO-1243zf, HFO-1225ye, HFO-1234ze, 3,3,3-trifluoro-1-propyne, HCFO-1233xf, HFC-245cb and combinations thereof.

In other embodiments of the invention, the fluoroolefin component of the refrigerant compositions comprises at least about 99 mass % HFO-1234ze and greater than 0 but less than 1 mass % of at least one member selected from the group consisting of HFO-1234yf, HFC-245fa, HFC-236fa, HFO-1234ye and combinations thereof.

In other embodiments of the invention, the fluoroolefin component of the refrigerant compositions comprises one or more of the foregoing fluoroolefins that are blended with at least one hydrofluorocarbon. Examples of suitable hydrofluorocarbons comprise at least one member selected from the group consisting of HFC-32, HFC-125, HFC-134a, HFC-152a, 236fa and HFC-227ea. The amount of hydrofluorocarbon can range from about 25 to about 75, about 30 to about about 30 to about 50. In one particular embodiment, the foregoing amounts of hydrofluorocarbon are blended with at least one of HFO-1234yf and HFO-1234ze.

If desired, the blended composition can further comprise at least one additional member selected from the group consisting of HCC-40, HCFC-22, CFC-115, HCFC-124, HCFC-1122, and CFC-1113. The amount of the additional member can comprise greater than 0 to about 5 wt %, about 0 to about 2 wt % and in some cases about 0 to about 0.5 wt %. In one particular embodiment, the foregoing amounts of additional members are blended with at least one of HFO-1234yf and HFO-1234ze. In another particular embodiment, the foregoing amounts of additional members are blended with at least one of HFO-1234yf and HFO-1234ze and at least one hydrofluorocarbon selected from the group consisting of HFC-32, HFC-125, HFC-134a, HFC-152a, 236fa and HFC-227ea, and in some cases, combined with carbon dioxide.

The lubricant component of the refrigerant compositions can comprise those suitable for use with refrigeration or air-conditioning apparatus. Among these lubricants are those conventionally used in compression refrigeration apparatus utilizing chlorofluorocarbon refrigerants. Such lubricants and their properties are discussed in the 1990 ASHRAE Handbook, Refrigeration Systems and Applications, chapter 8, titled "Lubricants in Refrigeration Systems", pages 8.1 through 8.21, herein incorporated by reference. Lubricants of the present invention may comprise those commonly known as "mineral oils" in the field of compression refrigeration lubrication. Mineral oils comprise paraffins (i.e. straight-chain and branched-carbon-chain, saturated hydrocarbons), naphthenes (i.e. cyclic or ring structure saturated hydrocarbons, which may be paraffins) and aromatics (i.e. unsaturated, cyclic hydrocarbons containing one or more rings characterized by alternating double bonds). Lubricants of the present invention further comprise those commonly known as "synthetic oils" in the field of compression refrigeration lubrication. Synthetic oils comprise alkylaryls (i.e. linear and branched alkyl alkylbenzenes), synthetic paraffins and naphthenes, silicones, and poly-alpha-olefins. Representative conventional lubricants of the present invention are the commercially available BVM 100 N (paraffinic mineral oil sold by BVA Oils), naphthenic mineral oil commercially available under the trademark from Suniso® 3GS and Suniso® 5GS by Crompton Co., naphthenic mineral oil commercially available from Pennzoil under the trademark Sontex® 372LT, naphthenic mineral oil commercially available from Calumet Lubricants under the trademark Calumet® RO-30, linear alkylbenzenes commercially available from Shrieve Chemicals under the trademarks Zerol® 75, Zerol® 150 and Zerol® 500 and branched alkylbenzene, sold by Nippon Oil as HAB 22.

In another embodiment, the lubricant component of the present inventive refrigerant compositions can comprise those which have been designed for use with hydrofluorocarbon refrigerants and are miscible with refrigerants and inhibitors of the present invention under compression refrigeration and air-conditioning apparatus' operating conditions. Such lubricants and their properties are discussed in "Synthetic Lubricants and High-Performance Fluids", R. L. Shubkin, editor, Marcel Dekker, 1993. Such lubricants include, but are not limited to, polyol esters (POEs) such as Castrol® 100 (Castrol, United Kingdom), polyalkylene glycols (PAGs) such as RL-488A from Dow (Dow Chemical, Midland, Michigan), and polyvinyl ethers (PVEs).

Lubricants of the present invention are selected by considering a given compressor's requirements and the environment to which the lubricant will be exposed. The amount of lubricant can range from about 1 to about 50, about 1 to about 20 and in some cases about 1 to about 3. In one particular embodiment, the foregoing refrigerant compositions are combined with a PAG lubricant for usage in an automotive A/C system having an internal combustion engine. In another particular embodiment, the foregoing refrigerant compositions are combined with a POE lubricant for usage in an automotive A/C system having an electric or hybrid electric drive train.

The inhibitor has sufficient miscibility in the lubricant such that a portion of the inhibitor is present within the lubricant. The amount of inhibitor present in the lubricant may vary when the refrigerant composition is employed as a working fluid or heat transfer medium.

In one embodiment of the invention, in addition to the inventive inhibitor, the refrigerant composition can comprise at least one additive which can improve the refrigerant and air-conditioning system lifetime and compressor durability are desirable. In one aspect of the invention, the foregoing refrigerant compositions comprise at least one member selected from the group consisting of acid scavengers, performance enhancers, and flame suppressants.

Additives which can improve the refrigerant and A/C lifetime and compressor durability are desirable. In one aspect of the invention, the inventive refrigerant composition is used to introduce lubricant into the A/C system as well as other additives, such as a) acid scavengers, b) performance enhancers, and c) flame suppressants.

An acid scavenger may comprise a siloxane, an activated aromatic compound, or a combination of both. Serrano et al (paragraph 38 of US 2011/0272624 A1), which is hereby incorporated by reference, discloses that the siloxane may be any molecule having a siloxyfunctionality. The siloxane may include an alkyl siloxane, an aryl siloxane, or a siloxane containing mixtures of aryl and alkyl substituents. For example, the siloxane may be an alkyl siloxane, including a dialkylsiloxane or a polydialkylsiloxane. Preferred siloxanes include an oxygen atom bonded to two silicon atoms, i.e., a group having the structure: SiOSi. For example, the siloxane may be a siloxane of Formula IV: R1[Si(R2R3)4O]nSi(R2R3)R4, Where n is 1 or more. Siloxanes of Formula IV have n that is preferably 2 or more, more preferably 3 or more, (e.g., about 4 or more). Siloxanes of formula IV have n that is preferably about 30 or less, more preferably about 12 or less, and most preferably about 7 or less. Preferably the R4 group is an aryl group or an alkyl group. Preferably the R2 groups are aryl groups or alkylgroups or mixtures thereof. Preferably the R3 groups are aryl groups or alkyl groups or mixtures thereof. Preferably the R4 group is an aryl group or an alkyl group. Preferably R1, R2, R3, R4, or any combination thereof are not hydrogen. The R2 groups in a molecule may be the same or different. Preferably the R2 groups in a molecule are the same. The R2 groups in a molecule may be the same or different from the R3 groups. Preferably, the R2 groups and R3 groups in a molecule are the same. Preferred siloxanes include siloxanes of Formula IV, wherein R1, R2, R3, R4, R5, or any combination thereof is a methyl, ethyl, propyl, or butyl group, or any combination thereof. Exemplary siloxanes that may be used include hexamethyldisiloxane, polydimethylsiloxane, polymethylphenylsiloxane, dodecamethylpentasiloxane, decamethylcyclo-pentasiloxane, decamethyltetrasiloxane, octamethyltrisiloxane, or any combination thereof.

Incorporated by previous reference from Serrano et al paragraph notes that in one aspect of the invention, the siloxane is an alkylsiloxane containing from about 1 to about 12 carbon atoms, such as hexamethyldisiloxane. The siloxane may also be a polymer such as polydialkylsiloxane, Where the alkyl group is a methyl, ethyl, propyl, butyl, or any combination thereof. Suitable polydialkylsiloxanes have a molecular weight from about 100 to about 10,000. Highly preferred siloxanes include hexamethyldisiloxane, polydimethylsiloxane, and combinations thereof. The siloxane may consist essentially of polydimethylsiloxane, hexamethyldisiloxane, or a combination thereof.

The activated aromatic compound may be any aromatic molecule activated towards a Friedel-Crafts addition reaction, or mixtures thereof. An aromatic molecule activated towards a Friedel-Crafts addition reaction is defined to be any aromatic molecule capable of an addition reaction with mineral acids. Especially aromatic molecules capable of addition reactions with mineral acids either in the application environment (AC system) or during the ASHRAE 97: 2007 "Sealed Glass Tube Method to Test the Chemical Stability of Materials for Use within Refrigerant Systems" thermal stability test. Such molecules or compounds are typically activated by substitution of a hydrogen atoms of the aromatic ring with one of the following groups: NH2, NHR, NRz, ADH, AD, NHCOCH3, NHCOR, 4OCH3, OR, CH3, 4C2H5, R, or C6H5, where R is a hydrocarbon (preferably a hydrocarbon containing from about 1 to about 100 carbon atoms). The activated aromatic molecule may be an alcohol, or an ether, where the oxygen atom (i.e., the oxygen atom of the alcohol or ether group) is bonded directly to an aromatic group. The activated aromatic molecule may be an amine Where the nitrogen atom (i.e., the nitrogen atom of the amine group) is bonded directly to an aromatic group. By way of example, the activated aromatic molecule may have the formula ArXRn, Where X is O (i.e., oxygen) or N (i.e., nitrogen); n:1 When X:O; n:2 When x:N; Ar is an aromatic group (i.e., group, C6H5); R may be H or a carbon containing group; and When n:2, the R groups may be the same or different. For example, R may be H (i.e., hydrogen), Ar, an alkyl group, or any combination thereof, Exemplary activated aromatic molecules that may be employed in a refrigerant composition according to the teachings herein include diphenyl oxide (i.e., diphenyl ether), methyl phenyl ether (e.g., anisole), ethyl phenyl ether, butyl phenyl ether or any combination thereof. One highly preferred aromatic molecule activated to Wards a Friedel-Crafts addition reaction is diphenyl oxide.

Incorporated by previous reference from Serrano et al. The acid scavenger (e.g., the activated aromatic compound, the siloxane, or both) may be present in any concentration that results in a relatively low total acid number, a relatively low total halides concentration, a relatively low total organic acid concentration, or any combination thereof. Preferably the acid scavenger is present at a concentration greater than about 0.0050 wt %, more preferably greater than about 0.05 wt % and even more preferably greater than about 0.1 wt % (e.g. greater than about 0.5 wt %) based on the total weight of the refrigerant composition. The acid scavenger preferably is present in a concentration less than about 3 wt %, more preferably less than about 2.5 wt % and most preferably greater than about 2 wt % (e. g. less than about 1.8 wt %) based on the total Weight of the refrigerant composition.

Additional examples of acid scavengers which may be included in the refrigerant composition and preferably are excluded from the refrigerant composition include those described by Kaneko (U.S. patent application Ser. No. 11/575,256, published as U.S. Patent Publication 2007/0290164, paragraph 42, expressly incorporated herein by reference), such as one or more of: phenyl glycidyl ethers, alkyl glycidyl ethers, alkyleneglycolglycidylethers, cyclohexeneoxides, otolenoxides, or epoxy compounds such as epoxidized soybean oil, and those described by Singh et al. (U.S. patent application Ser. No. 11/250,219, published as 20060116310, paragraphs 34-42, expressly incorporated herein by reference).

Preferred additives include those described in U.S. Pat. Nos. 5,152,926; 4,755,316, which are hereby incorporated by reference. In particular, the preferred extreme pressure additives include mixtures of (A) tolyltriazole or substituted derivatives thereof, (B) an amine (e.g. Jeffamine M-600) and (C) a third component which is (i) an ethoxylated phosphate ester (e.g. Antara LP-700 type), or (ii) a phosphate alcohol (e.g. ZELEC 3337 type), or (iii) a Zinc dialkyldithiophosphate (e.g. Lubrizol 5139, 5604, 5178, or 5186 type), or (iv) a mercaptobenzothiazole, or (v) a 2,5-dimercapto-1,3,4-triadiaZole derivative (e. g. Curvan 826) or a mixture thereof. Additional examples of additives which may be used are given in U.S. Pat. No. (Schnur, 5:12-6:51, hereby incorporated by reference).

Acid number is measured according to ASTM D664-01 in units of mg KOH/g. The total halides concentration, the fluorine ion concentration, and the total organic acid concentration is measured by ion chromatography. Chemical stability of the refrigerant system is measured according to ASHRAE 97: 2007 (RA 2017) "Sealed Glass Tube Method to Test the Chemical Stability of Materials for Use within Refrigerant Systems". The viscosity of the lubricant is tested at 40° C. according to ASTM D-7042.

Mouli et al. (WO 2008/027595 and WO 2009/042847) teach the use of alkyl silanes as a stabilizer in refrigerant compositions containing fluoroolefins. Phosphates, phosphites, epoxides, and phenolic additives also have been employed in certain refrigerant compositions. These are described for example by Kaneko (U.S. patent application Ser. No. 11/575,256, published as U.S. Publication 2007/0290164) and Singh et al. (U.S. patent application Ser. No. 11/250,219, published as U.S. Publication 2006/0116310). All of these aforementioned applications are expressly incorporated herein by reference.

Preferred flame suppressants include those described in patent application "Refrigerant compositions containing fluorine substituted olefins CA 2557873 A1" and incorporated by reference along with fluorinated products such as HFC-125 and/or Krytox® lubricants, also incorporated by reference and described in patent application "Refrigerant compositions comprising fluoroolefins and uses thereof WO2009018117A1."

The refrigerant compositions of the present invention may be prepared by any convenient method to combine the desired amount of the individual components. A preferred method is to weigh the desired component amounts and thereafter combine the components in an appropriate vessel. Agitation may be used, if desired.

The present invention further relates to a process for producing cooling comprising condensing a refrigerant composition comprising at least one fluoroolefin, at least one lubricant and an effective amount of inhibitor, and thereafter evaporating said composition in the vicinity of a body to be cooled.

A body to be cooled may be any space, location or object requiring refrigeration or air-conditioning. In stationary applications the body may be the interior of a structure, i.e., residential or commercial, or a storage location for perishables, such as food or pharmaceuticals. For mobile refrigeration applications the body may be incorporated into a transportation unit for the road, rail, sea or air. Certain refrigeration systems operate independently with regards to any moving carrier, these are known as "intermodal" systems. Such intermodal systems include "containers" (combined sea/land transport) as well as "swap bodies" (combined road and rail transport).

The present invention further relates to a process for producing heat comprising condensing a refrigerant composition comprising at least one fluoroolefin, at least one lubricant and an effective amount of an inhibitor comprising at least one of limonene and a-terpinene in the vicinity of a body to be heated, and thereafter evaporating said composition.

A body to be heated may be any space, location or object requiring heat. These may be the interior of structures either residential or commercial in a similar manner to the body to be cooled. Additionally, mobile units as described for cooling may be similar to those requiring heating. Certain transport units require heating to prevent the material being transported from solidifying inside the transport container.

Another embodiment of the invention relates to a air-conditioning or refrigeration apparatus comprising the foregoing refrigerant compositions.

Another embodiment of the invention relates to storing the foregoing refrigerant compositions in gaseous and/or liquid phases within a sealed container wherein the oxygen and/or water concentration in the gas and/or liquid phases ranges from about 3 vol ppm to less than about 3,000 vol ppm at a temperature of about 25° C., about 5 vol ppm to less than about 1,000 vol ppm and in some cases about 5 vol ppm to less than about 500 vol ppm.

The container for storing the foregoing refrigerant compositions can be constructed of any suitable material and design that is capable of sealing the refrigerant compositions therein while maintaining gaseous and liquids phases. Examples of suitable containers comprise pressure resistant containers such as a tank, a filling cylinder, and a secondary filing cylinder. The container can be constructed from any suitable material such as carbon steel, manganese steel, chromium-molybdenum steel, among other low-alloy steels, stainless steel and in some case an aluminum alloy. The container can include a pierce top or valves suitable for dispensing flammable substances.

While any suitable method can be employed for preparing the inventive refrigerant compositions, examples of such methods including blending the foregoing inhibitors with the foregoing fluoroolefin composition, purging lines and containers with a material comprising the inhibitor (e.g., an inhibitor with a nitrogen carrier, or the inventive stabilized composition) and combining with a lubricant; among other suitable methods.

In one embodiment, the inventive composition is prepared by adding the inhibitor to at least one of the fluoroolefin component and the lubricant, and then combining the fluorolefin component with the lubricant. In the event, the inhibitor is added to only one of the fluoroolefin or lubricant and then the fluoroolefin and lubricant are combined, the inhibitor will partition such that the inhibitor becomes present in the fluoroolefin and lubricant. In another embodiment, the inhibitor can be added to a composition comprising at least one fluoroolefin component and at least one lubricant.

The following examples are provided to illustrate certain embodiments of the invention and shall not limit the scope of the appended claims. Example 1 illustrates the effectiveness of the inhibitor with a fluoroolefin, Example 2 illustrates the effectiveness of the inhibitor with a fluoroolefin and a lubricant, and Example 3 illustrates phase equilibria and AC cycle performance with ternary R-1234yf/d-limonene/lubricant (commercially available as POE32-3MAF) systems.

EXAMPLE 1

A mixture of HFO-1234yf (30g having at least 99.5 wt % purity*) and initiator (and with and without inhibitor) was heated in a 210mL shake tube at the temperature and for the period of time given in Table 4. The shake tube was visually inspected for polymer formation as well as by using NMR in accordance with conventional methods. Polymer can also be detected by using conventional IR methods.

*The HFO-1234yf comprised 99.7 wt % HFO-1234yf, 1,000ppm HFO-1234ze, 150pp HFO-1225yeZ, 3ppm trifluoropropyne with the remainder comprising compounds that do not affect the refrigeration performance of the mixture or activity of the inhibitor.

TABLE 4

| Examples | Inhibitor | concen. (ppm) | Initiator | time | T(° C.) | polymer (wt %) |
|---|---|---|---|---|---|---|
| Control-1 | None |  | air (3300 ppm) | 2 weeks | 75 | 0.003 |
| 1 | d-limonene | 50 ppm | air (3300 ppm) | 2 weeks | 75 | N/D |
| 2 | d-limonene | 100 ppm | air (3300 ppm) | 2 weeks | 75 | N/D |
| 3 | α-terpinene | 100 ppm | air (3300 ppm) | 2 weeks | 75 | N/D |
| Control-2 | None |  | air (10,000 ppm) | 2 weeks | 100 | 2.8 |
| 4 | d-limonene | 500 ppm | air (10,000 ppm) | 2 weeks | 100 | <1 |
| 5 | d-limonene | 1000 ppm | air (10,000 ppm) | 2 weeks | 100 | <1 |
| 6 | α-terpinene | 1000 ppm | air (10,000 ppm) | 2 weeks | 100 | <1 |
| Control-3 | None |  | cumene hydroperoxide (1700 ppm) | 3 days | 50 | 0.07 |
| 7 | d-limonene | 100 ppm | cumene hydroperoxide (1700 ppm) | 3 days | 50 | N/D |
| 8 | α-terpinene | 100 ppm | cumene hydroperoxide (1700 ppm) | 3 days | 50 | N/D |
| Control-4 | None |  | air (3300 ppm) | 2 weeks | 150 | 0.05 |
| 9 | d-limonene | 100 ppm | air (3300 ppm) | 2 weeks | 150 | <0.003 |
| 10 | d-limonene | 200 ppm | air (3300 ppm) | 2 weeks | 150 | N/D |

TABLE 4-continued

| Examples | Inhibitor | concen. (ppm) | Initiator | time | T(° C.) | polymer (wt %) |
|---|---|---|---|---|---|---|
| 11 | α-terpinene | 200 ppm | air (3300 ppm) | 2 weeks | 150 | N/D |
| Control-5 | None | | air (6600 ppm) | 2 weeks | 100 | 1.34 |
| 12 | d-limonene | 100 ppm | air (6600 ppm) | 2 weeks | 100 | <0.003 |
| 13 | d-limonene | 200 ppm | air (6600 ppm) | 2 weeks | 100 | N/D |
| 14 | α-terpinene | 200 ppm | air (6600 ppm) | 2 weeks | 100 | N/D |
| 15 | α-terpinene + butylated hydroxytoluene | 200 ppm | air (6600 ppm) | 2 weeks | 100 | N/D |
| 16 | d-limonene + butylated hydroxytoluene | 200 ppm | air (6600 ppm) | 2 weeks | 101 | N/D |
| Control-6 | None | | air (6600 ppm) | 2 weeks | 40 | 0.003 |
| Control-7 | None | | air (10,000 ppm) | 2 weeks | 40 | 0.01 |
| 17 | d-limonene | 200 | air (6600 ppm) | 2 weeks | 40 | N/D |
| 18 | d-limonene | 200 | air (10,000 ppm) | 2 weeks | 40 | N/D |
| 19 | α-terpinene | 200 | air (6600 ppm) | 2 weeks | 40 | N/D |
| 20 | α-terpinene | 200 | air (10,000 ppm) | 2 weeks | 40 | N/D |
| 21 | α-terpinene + butylated hydroxytoluene | 200 | air (6600 ppm) | 2 weeks | 40 | N/D |
| 22 | d-limonene + butylated hydroxytoluene | 200 | air (10,000 ppm) | 2 weeks | 40 | N/D |

EXAMPLE 2

A refrigerant blend comprising a mixture of HFO-1234yf (30g having the composition of Example 1), at least one additional compound and an initiator (and without inhibitor) was heated in a 210 mL shake tube at the temperature and for the period of time given in Table 5. Examples 1-6 evaluate an inhibitor with Opteon TM XP-10 refrigerant (R513a) and a commercially available lubricant. Examples 7-12 evaluate an inhibitor with Opteon™ XP-40 refrigerant (R449a) and a commercially available lubricant. Examples 13-18 evaluate an inhibitor with HFO-1234yf and a commercially available lubricant. XP10 refrigerant comprises 56 wt % HFO1234yf and 44 wt % HFC-134a, and XP40 refrigerant comprises 24.3 wt % R32, 24.7 wt % R125, 25.3 wt.% 1234yf, and 25.7 wt % 134a. XP10 and XP40 refrigerants are commercially available from The Chemours Company. The shake tube was visually inspected for polymer formation as well as by using NMR. Data reported below is ppm by weight.

TABLE 5

| Examples | Inhibitor | concen. (ppm) | Lubricant | Initiator | Time | T (° C.) | polymer (wt %) |
|---|---|---|---|---|---|---|---|
| Control | None | | | air (2000 ppm) | 2 weeks | 135 | 0.003 |
| 1 | d-limonene | 100 | POE32-3MAF | air (2000 ppm) | 2 weeks | 135 | N/D |
| 2 | α-terpinene | 100 | POE32-3MAF | air (2000 ppm) | 2 weeks | 135 | N/D |
| 3 | d-limonene | 100 | ND-11 | air (2000 ppm) | 2 weeks | 135 | N/D |
| 4 | α-terpinene | 100 | ND-11 | air (2000 ppm) | 2 weeks | 135 | N/D |
| 5 | d-limonene | 100 | ND-12 | air (2000 ppm) | 2 weeks | 135 | N/D |
| 6 | α-terpinene | 100 | ND-12 | air (2000 ppm) | 2 weeks | 135 | N/D |
| Control | None | | | air (1000 ppm) | 2 weeks | 135 | 0.003 |
| 7 | d-limonene | 50 | POE32-3MAF | air (1000 ppm) | 2 weeks | 135 | N/D |
| 8 | α-terpinene | 50 | POE32-3MAF | air (1000 ppm) | 2 weeks | 135 | N/D |
| 9 | d-limonene | 50 | ND-11 | air (1000 ppm) | 2 weeks | 135 | N/D |
| 10 | α-terpinene | 50 | ND-11 | air (1000 ppm) | 2 weeks | 135 | N/D |
| 11 | d-limonene | 50 | ND-12 | air (1000 ppm) | 2 weeks | 135 | N/D |
| 12 | α-terpinene | 50 | ND-12 | air (1000 ppm) | 2 weeks | 135 | N/D |
| Control | None | | | air (10,000) | 2 weeks | 100 | 2.8 |
| 13 | d-limonene | 100 | POE32-3MAF | air (10,000) | 2 weeks | 100 | N/D |
| 14 | α-terpinene | 100 | POE32-3MAF | air (10,000) | 2 weeks | 100 | N/D |
| 15 | d-limonene | 100 | ND-11 | air (10,000) | 2 weeks | 100 | N/D |
| 16 | α-terpinene | 100 | ND-11 | air (10,000) | 2 weeks | 100 | N/D |
| 17 | d-limonene | 100 | ND-12 | air (10,000) | 2 weeks | 100 | N/D |
| 18 | α-terpinene | 100 | ND-12 | air (10,000) | 2 weeks | 100 | N/D |

EXAMPLE 3

Binary Phase Behavior

Figure 2:
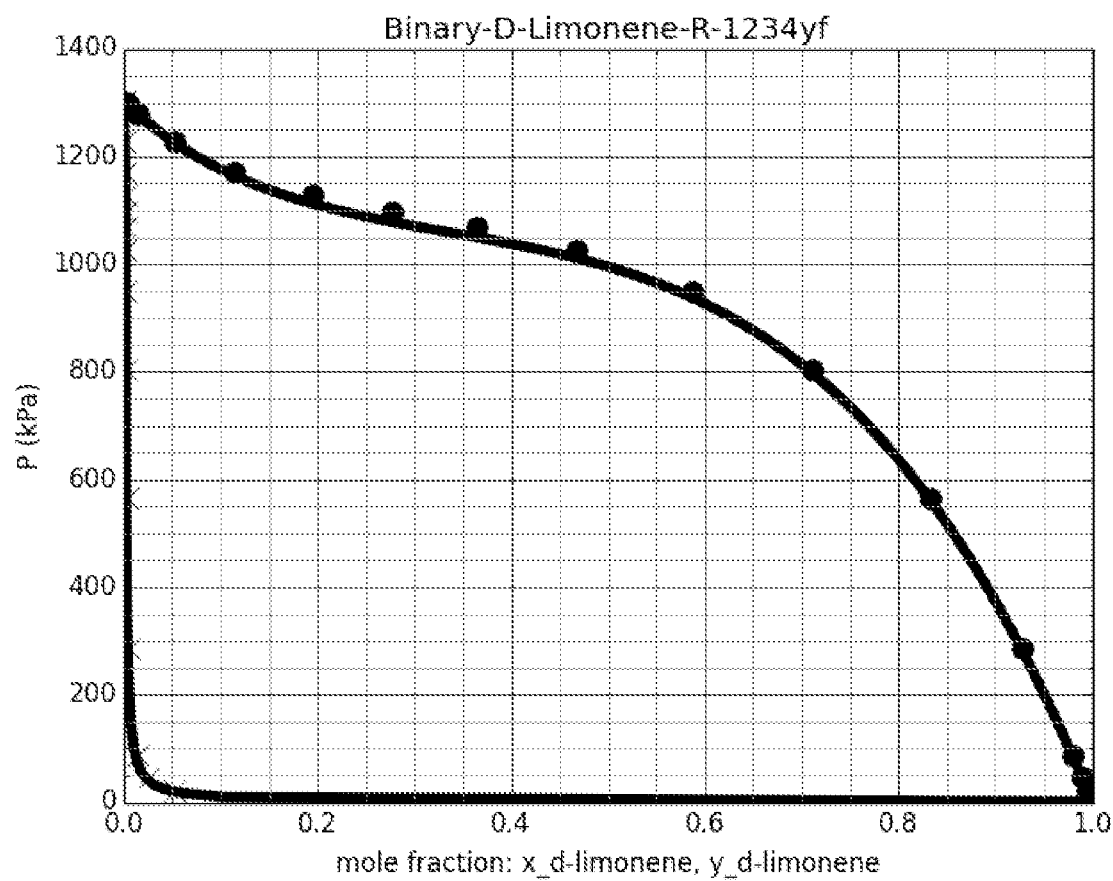
FIG. 2 is a graphical representation of NRTL fit to experimental VLE of R-1234yf/d-limonene.
Figure 3:
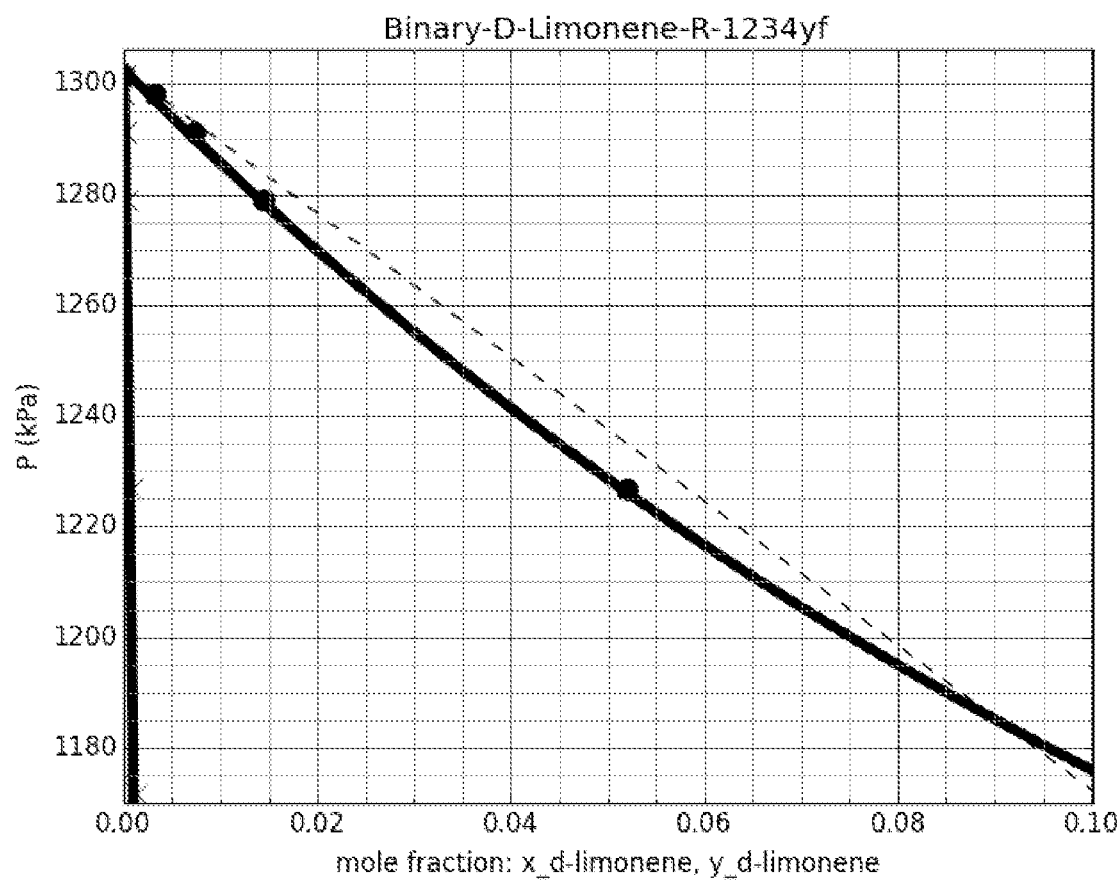
FIG. 3 is a graphical representation of an expanded view of R-1234yf-rich domain of R-1234yf/d-limonene showing negative deviations from Raoult's Law.
Figure 4:
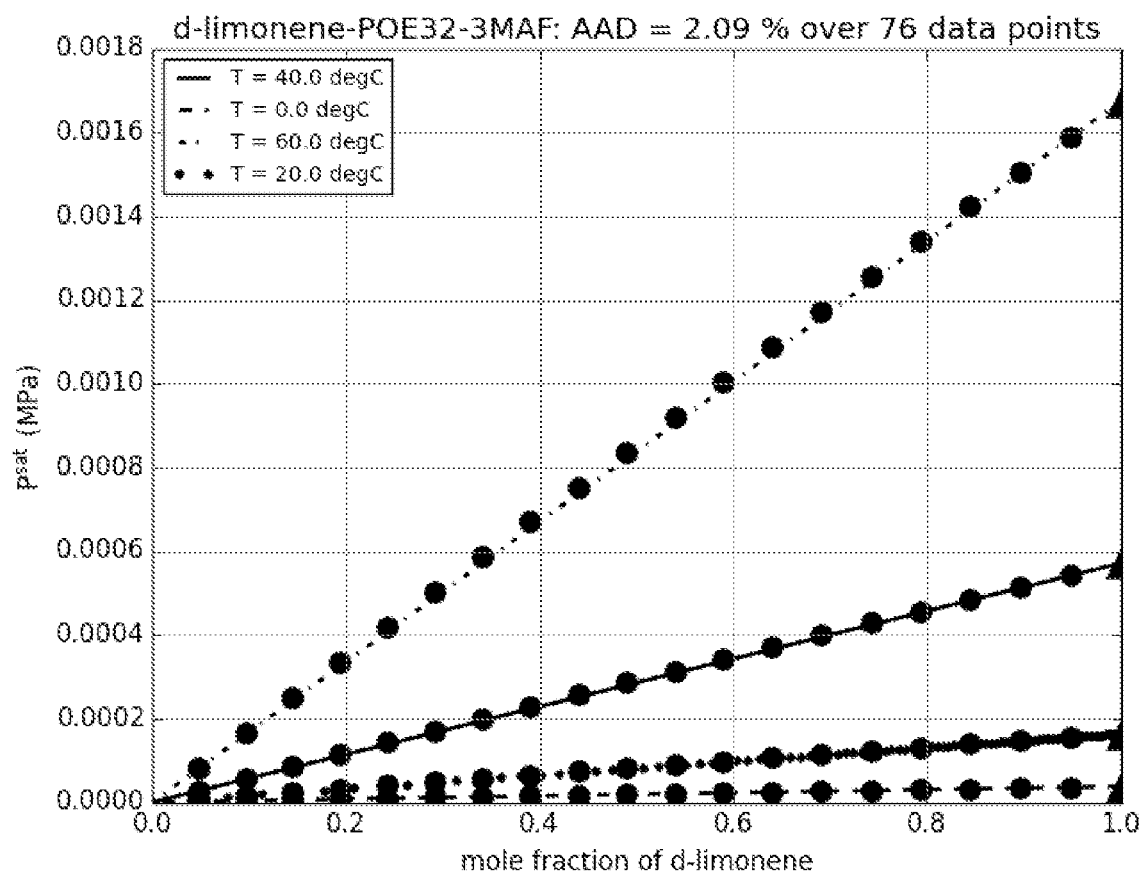
FIG. 4 is a graphical representation of NRTL fit using calculated d-limonene/POE32-3MAF VLE data.

To analyze the phase behavior and d-limonene partitioning of R-1234yf/d-limonene/lubricant (POE32-3MAF) systems, NRTL binary interaction parameters were fit to the following binary data:
1) R-1234yf/POE32-3MAF—VLE solubility data from -25 to 75° C. were measured. The NRTL binary interaction parameters were fit to VLE resulting in the prediction of VLLE, where liquid-liquid phase splitting is predicted toward the R-1234yf rich side of the composition domain. The fit quality is excellent, with a deviation of 2.1% AARD from the data and is shown with the data in FIG. 1.
2) R-1234yf/d-limonene—VLE bubble point data was measured at 50° C. and NRTL binary interaction parameters were fit to experimental data fit to an accuracy of 2.1% AARD. In the d-limonene-line region of composition space, negative deviations from Raoult's Law are observed from 0 to about 9 mol-% d-limonene, indicating that R-1234yf/d-limonene interactions are stronger than R-1234yf/R-1234yf and d-limonene/d-limonene interactions. This is not expected behavior and makes the d-limonene activity more locally prevalent near liquid R-1234yf. These data and model fit are shown in FIG. 2. The negative deviations from Raoult's Law are shown in FIG. 3.
3) d-limonene/POE32-3MAP—was determined using computer software-based parameterization in order to calculate VLE behavior. The calculated VLE is shown in FIG. 4.

Ternary Phase Behavior

Figure 5:
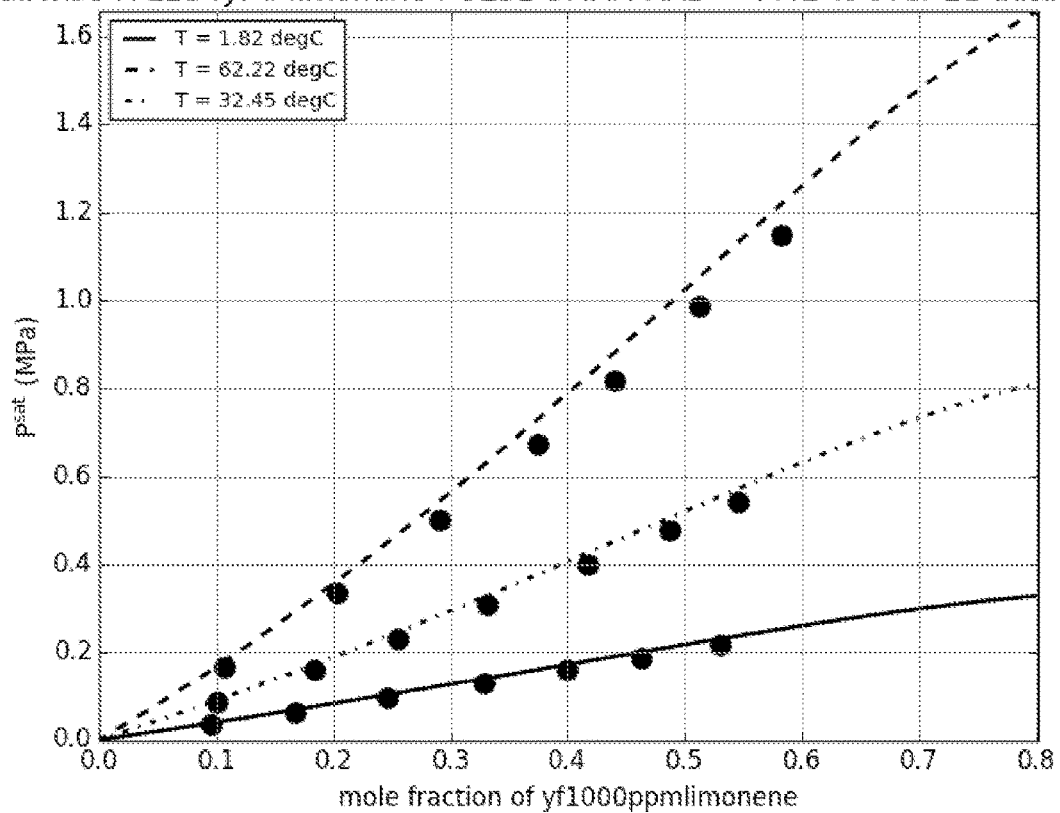
FIG. 5 is a graphical representation of a ternary VLLE calculation of R-1234yf/1000 ppm d-limonene/POE32-3MAF.

Experimental bubble point pressures were experimentally measured at various POE32-3MAF contents with a binary mixture of 1000 ppm by weight d-limonene in R-1234yf An NRTL model was used to calculate LLEs for this ternary system. The binary interaction parameter data (shown in FIGS. 1-3) for R-1234yf/POE32-3MAF, d-limonene/POE32-3MAF and R-1234yf/d-limonene are then used to calculate the ternary phase behavior of the R-1234yf/d-limonene/POE32-3MAF system, as shown in FIG. 5.

The data and calculations shown in FIG. 1-5 can be employed to determine phase behavior (partitioning affects) and A/C performance of d-limonene for amounts less than and greater than 1,000 ppm.

The data and calculations shown in FIGS. 1-5 also illustrate vapor-liquid equilibria partitioning of d-limonene such that the vapor will be R-1234yf substantially free of d-limonene and d-limonene will remain primarily in the liquid phases, either in the evaporator or compressor oil sump, wherein the vapor circulating in an A/C system is substantially free of d-limonene. As a result, d-limonene will not have a significant impact on the power efficiency or capacity of A/C systems because the d-limonene will be predominately present in the liquid phases.

Although certain aspects, embodiments and principals have been described above, it is understood that this description is made only way of example and not as limitation of the scope of the invention or appended claims. The foregoing various aspects, embodiments and principals can be used alone and in combinations with each other.

What is claimed is:

1. A refrigerant composition comprising HFO-1234ze, HFO-1225ye, trifluoropropyne and greater than 99 wt. % HFO-1234yf hydrofluoroolefin, and
   a. at least one lubricant,
   b. at least one member selected from the group consisting of air, oxygen, cumene hydroperoxide, and fluoroolefin polyperoxides, peroxides, hydroperoxides, persulfates, percarbonates, perborates and hydropersulfates, and
   c. a liquid inhibitor in an amount of between about 50 and less than 1000 ppm which remains liquid in at least one of an evaporator or a compressor sump under operating conditions and comprises at least limonene to render the composition with less than about 0.03 wt. % of homopolymeric products derived from the HFO-1234yf hydrofluoroolefin.

2. The composition of claim 1 wherein the composition comprises less than about 0.003 wt % of homopolymeric products.

3. The composition of claim 1 further comprising at least one member selected from the group consisting of HFC-32, HFC-125, HFC-134a, HFC-152a, HFC-236fa, HFC-227ea and carbon dioxide.

4. The composition of claim 1 or 3 further comprising at least one member selected from the group consisting of HFC-134a, HFO-1243zf, HCFO-1233xf, HFC-244bb and HFC-245cb.

5. The composition of claim 1 or 3 further comprising at least one member selected from the group consisting of HCC-40, HCFC-22, CFC-115, HCFC-124, HCFC-1122, and CFC-1113.

6. The composition of claim 1 wherein the inhibitor is present in an amount of about 30 to about 500 ppm.

7. The composition of claim 1 further comprising at least one member selected from the group consisting of butylated hydroxytoluene, butylated hydroxyanisole, tertiary-butylhydroquinone, gallate, 2-phenyl-2-propanol, 1-(2,4,5-trihydroxyphenyl)-1-butaone, phenolics, bisphenol methane derivatives, and 2,2'-methylene bis (4-methyl-6-t-butyl phenol).

8. The composition of claim 1 further comprising at least one antioxidant.

9. The composition of claim 1 further comprising at least one member selected from the HFO-1225yeZ, HFO-1243zf, HFC-236ea, and HFC-245fa.

10. The composition of claim 9 wherein the member comprises HFO-1225yeZ.

11. The composition of claim 9 wherein the composition further includes one of HFO-1225yeZ, HFC-236ea, and HFC-245fa.

12. The composition of claim 1 wherein the composition is substantially free of at least one of ammonia and $CF_3I$.

13. The composition of claim 1 wherein the composition is substantially free of ammonia or $CF_3I$.

14. A container comprising the refrigerant composition of claim 1.

15. The composition of claim 1 wherein the inhibitor comprises d-limonene and the lubricant comprise POE.

16. The composition of claim 1 wherein the inhibitor is miscible in the lubricant.

17. The composition of claim 1 further comprising at least one member selected from the group consisting of HFO-1243zf and HFC-32.

18. The composition of claim 1 containing between 10 and 2000 ppm of air.

19. A refrigerant composition consisting essentially of hydrofluoroolefins comprising at least HFO-1234ze, HFO- 1225ye, trifluoropropyne, greater than 99 wt. % HFO-1234yf, and optionally HFO-1243zf, and
 a. at least one initiator compound in an amount up to 15,000 ppm,
 b. an inhibitor which remains liquid in at least one of an evaporator or a compressor sump under temperatures from about 75° C. to about 150° C., in an amount up to 500 ppm which reduces, if not eliminates, conversion of at least HFO-1234yf into polymeric products and is selected from at least one of limonene and a-terpinene, and
 c. optionally, at least one of a lubricant, an antioxidant, an acid scavenger, a performance enhancer, a phosphate lubricant stabilizer, and a flame suppressant.

20. The composition of claim 19 wherein the composition further comprises HFO-1243zf and the at least one initiator compound is selected from at least of air, oxygen, cumene hydroperoxide, and fluoroolefin polyperoxides, peroxides, hydroperoxides, persulfates, percarbonates, perborates and hydropersulfates.

21. The composition of claim 19 further comprising at least one member selected from the group consisting of HFO-1243zf and HFC-32.

\* \* \* \* \*